(12) United States Patent
Algreatly

(10) Patent No.: US 8,543,902 B2
(45) Date of Patent: Sep. 24, 2013

(54) CONVERTING A DRAWING INTO MULTIPLE MATRICES

(76) Inventor: Cherif Atia Algreatly, Newark, CA (US)

( * ) Notice: Subject to any disclaimer, the term of this patent is extended or adjusted under 35 U.S.C. 154(b) by 841 days.

(21) Appl. No.: 12/462,715

(22) Filed: Aug. 7, 2009

(65) Prior Publication Data

US 2010/0034485 A1    Feb. 11, 2010

Related U.S. Application Data

(63) Continuation-in-part of application No. 12/072,976, filed on Feb. 29, 2008, and a continuation-in-part of application No. 12/290,730, filed on Nov. 3, 2008, now abandoned.

(60) Provisional application No. 61/188,703, filed on Aug. 12, 2008, provisional application No. 61/188,732, filed on Aug. 12, 2008, provisional application No. 61/188,731, filed on Aug. 12, 2008, provisional application No. 61/188,733, filed on Aug. 12, 2008, provisional application No. 61/188,697, filed on Aug. 12, 2008, provisional application No. 61/197,425, filed on Oct. 27, 2008, provisional application No. 61/197,711, filed on Oct. 29, 2008, provisional application No. 61/203,761, filed on Dec. 29, 2008.

(51) Int. Cl.
*G06K 9/60* (2006.01)

(52) U.S. Cl.
USPC ........... 715/211; 345/418; 345/419; 345/420; 345/619; 382/307

(58) Field of Classification Search
USPC ......................................... 715/211
See application file for complete search history.

(56) References Cited

U.S. PATENT DOCUMENTS

| 2003/0122829 A1* | 7/2003 | McNamara et al. | 345/441 |
| 2007/0047809 A1* | 3/2007 | Sasaki | 382/170 |
| 2009/0034848 A1* | 2/2009 | Sakamoto et al. | 382/195 |

* cited by examiner

*Primary Examiner* — Doug Hutton, Jr.
*Assistant Examiner* — Zaida I Marrero

(57) ABSTRACT

The present invention enables converting the pictures, drawings, 3D models, or the like into a new graphics format that enables the computer system to extract positional, numerical, or directional information related to the objects of said pictures, drawings, or 3D models. The present invention enables providing a set of automated solutions for a design problem related to said objects, and identifying the objects' names in said pictures, drawings, or 3D model serving a variety of IT, medical, engineering, and industrial applications.

9 Claims, 26 Drawing Sheets

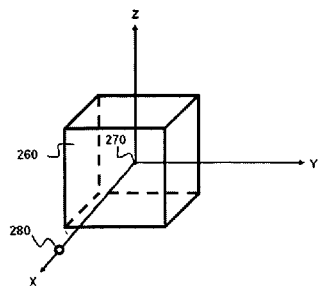 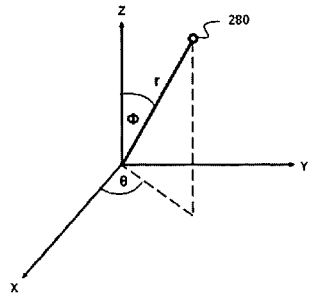 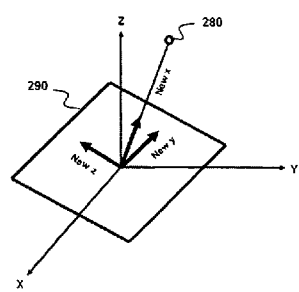
FIG. 20  FIG. 21  FIG. 22
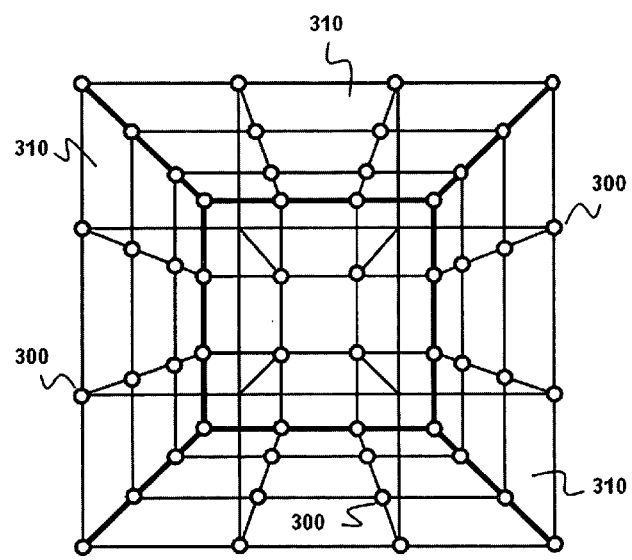
FIG. 23

Figure 24:
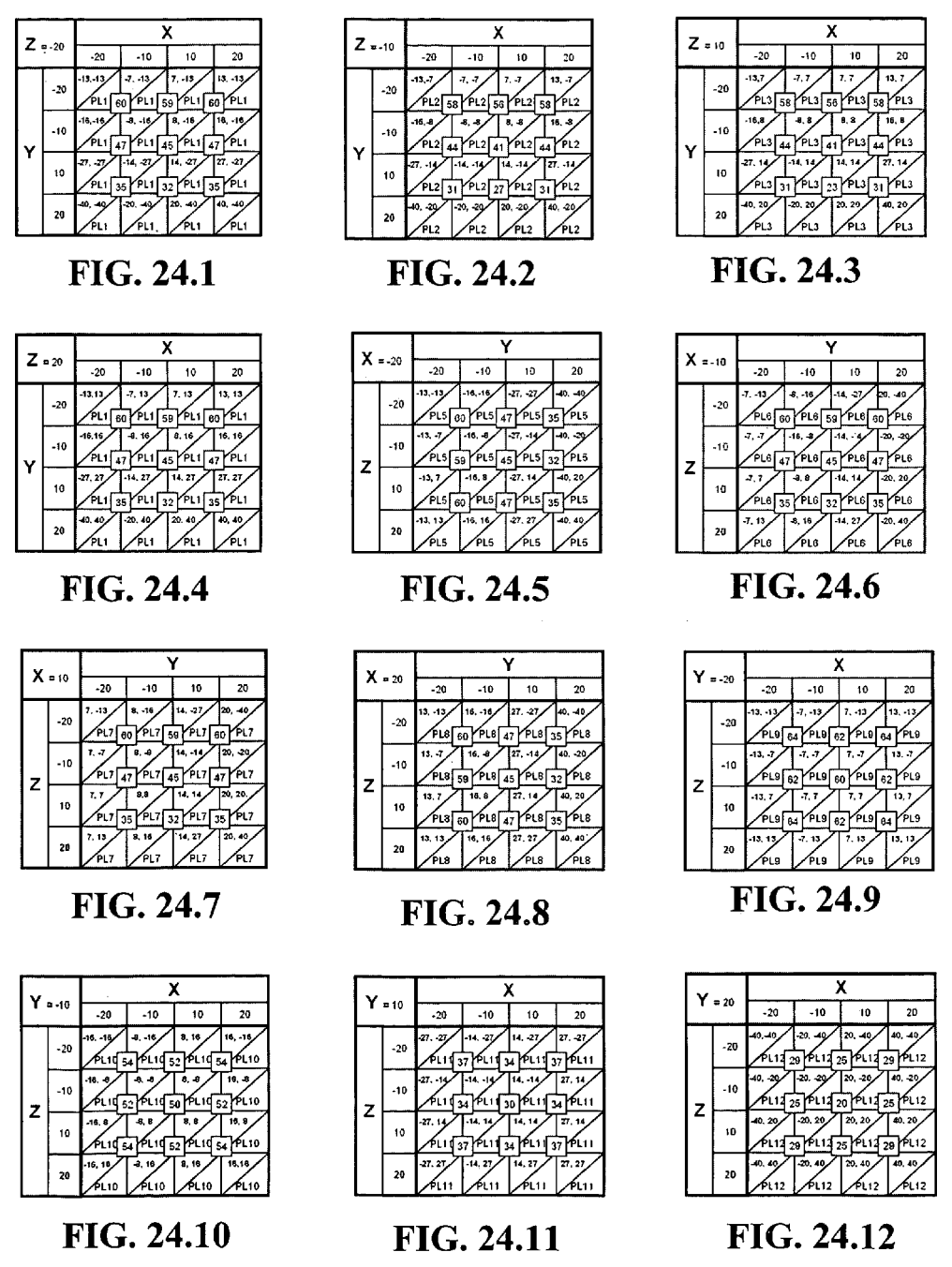

| No. | Clicked Axes | | Intersection Points | | | | | |
|---|---|---|---|---|---|---|---|---|
| | | | X-axis | | Y-axis | | Z-axis | |
| | 1st | 2nd | Start | Add. | Start | Add. | Start | Add. |
| 1 | +X | +Y | X | +1 | Y | +1 | Z | 0 |
| 2 | +X | -Y | X | +1 | Y | -1 | Z | 0 |
| 3 | -X | +Y | X | -1 | Y | +1 | Z | 0 |
| 4 | -X | -Y | X | -1 | Y | -1 | Z | 0 |
| 5 | +Y | +Z | X | 0 | Y | +1 | Z | +1 |
| 6 | +Y | -Z | X | 0 | Y | +1 | Z | -1 |
| 7 | -Y | +Z | X | 0 | Y | -1 | Z | +1 |
| 8 | -Y | -Z | X | 0 | Y | -1 | Z | -1 |
| 9 | +X | +Z | X | +1 | Y | 0 | Z | +1 |
| 10 | +X | -Z | X | +1 | Y | 0 | Z | -1 |
| 11 | -X | +Z | X | -1 | Y | 0 | Z | +1 |
| 12 | -X | -Z | X | -1 | Y | 0 | Z | -1 |
FIG. 25
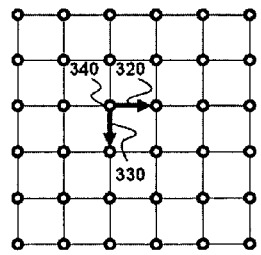
FIG. 26
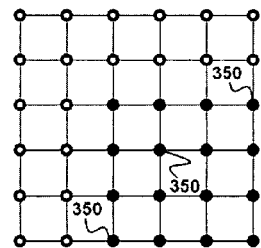
FIG. 27
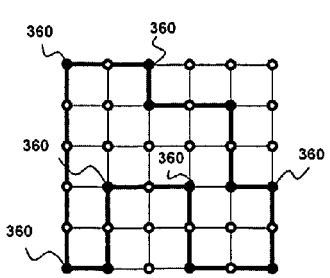
FIG. 28
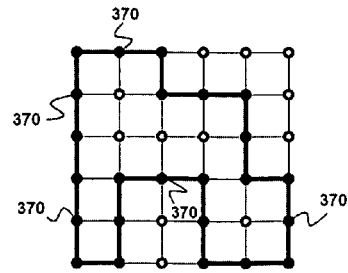
FIG. 29
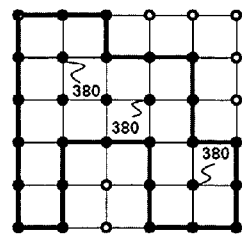
FIG. 30

```
┌─────────────────┐    ┌─────────────────┐    ┌─────────────────────┐
│ Activating the IPs that │ → │ Activating the IPs that │ → │ Activating the IPs that │
│ represent the polygon   │    │ represent the boundary  │    │ are located between the │
│ vertices                │    │ lines of the polygon    │    │ polygon boundary lines  │
└─────────────────┘    └─────────────────┘    └─────────────────────┘
```

FIG. 31

| Movement | | New Coordinates of the IPs of the moved plane |
|---|---|---|
| Direction | Distance | |
| Positive x-axis | d | P (x+d, y, z) |
| Negative x-axis | d | P (x-d, y, z) |
| Positive y-axis | d | P (x, y+d, z) |
| Negative y-axis | d | P (x, y-d, z) |
| Positive z-axis | d | P (x, y, z+d) |
| Negative z-axis | d | P (x, y, z-d) |

FIG. 32

| Copying | | New Coordinates of the IPs of the copied plane |
|---|---|---|
| Direction | Distance | |
| Positive x-axis | d | P (x+d, y, z) |
| Negative x-axis | d | P (x-d, y, z) |
| Positive y-axis | d | P (x, y+d, z) |
| Negative y-axis | d | P (x, y-d, z) |
| Positive z-axis | d | P (x, y, z+d) |
| Negative z-axis | d | P (x, y, z-d) |

FIG. 33

| Rotating about | Base Point Position | Original Position of the "IP" | New Position of the "IP" | | |
|---|---|---|---|---|---|
| | | | X | Y | Z |
| x-axis | (x0, y0, z0) | (x', y', z') | x' − (x'-x0)sin(90-a) | y' − (y'-y0)sin(90-a) | z' − (z'-z0) sin(a) |
| y-axis | (x0, y0, z0) | (x', y', z') | x' − (x'-x0)sin(90-b) | y' − (y'-y0)sin(90-b) | z' − (z'-z0) sin(b) |
| z-axis | (x0, y0, z0) | (x', y', z') | x' − (x'-x0)sin(90-c) | y' − (y'-y0)sin(90-c) | z' − (z'-z0) sin(b) |

FIG. 34

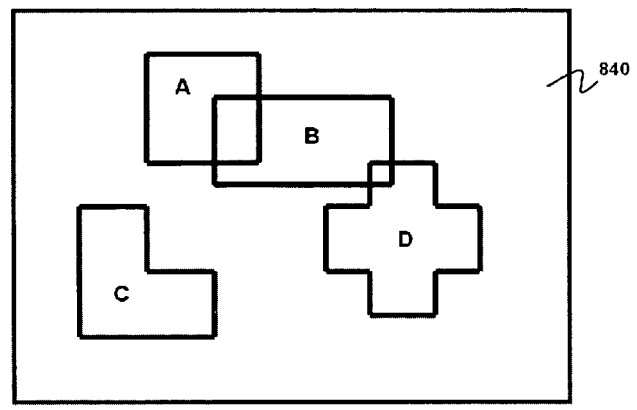
FIG. 48
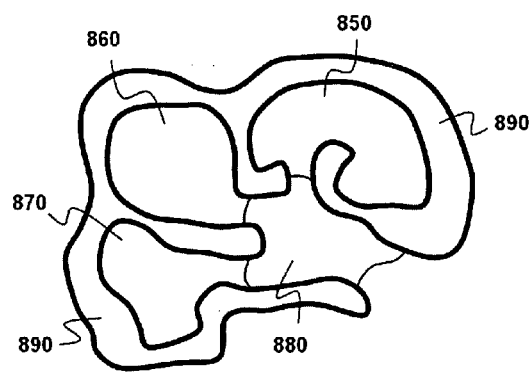
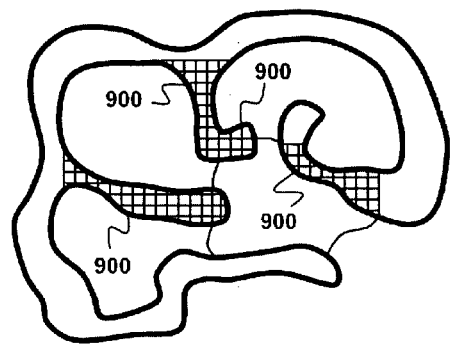
FIG. 49          FIG. 50

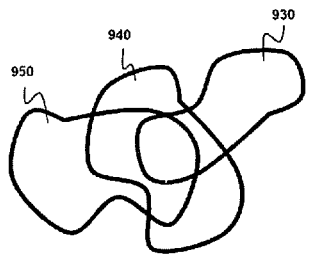
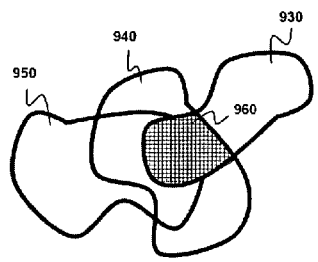
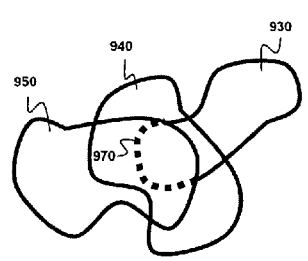
FIG. 53　　　　FIG. 54　　　　FIG. 55
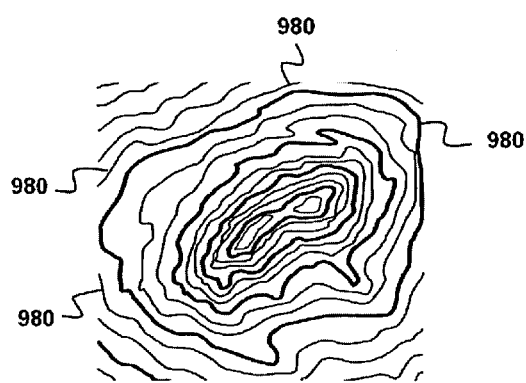
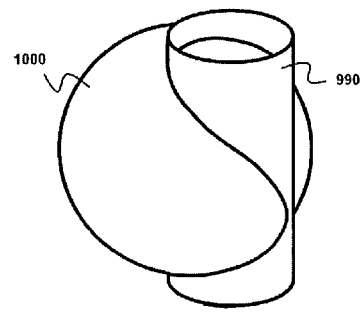
FIG. 56　　　　FIG. 57

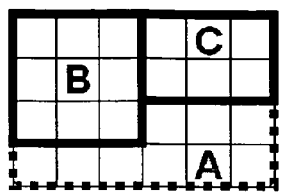
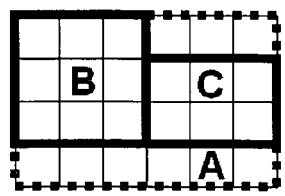
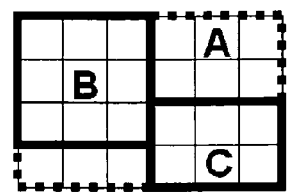
FIG. 68.1     FIG. 68.2     FIG. 68.3
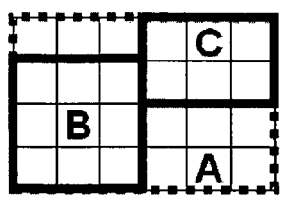
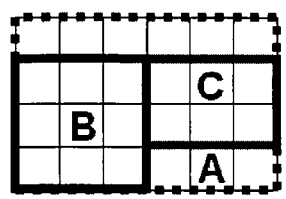
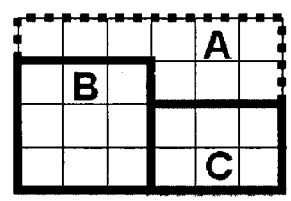
FIG. 68.4     FIG. 68.5     FIG. 68.6
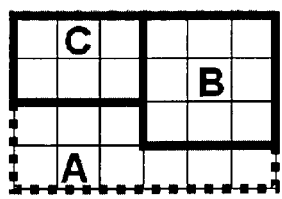
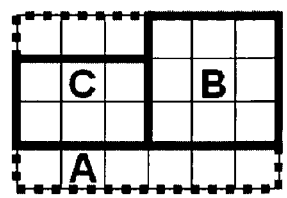
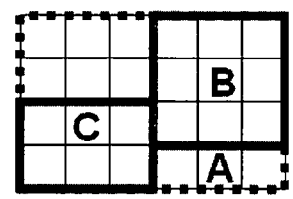
FIG. 68.7     FIG. 68.8     FIG. 68.9
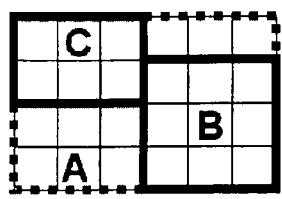
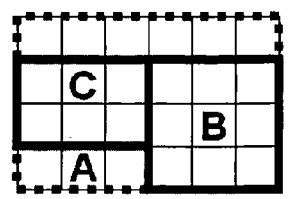
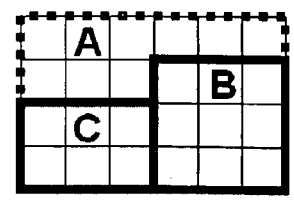
FIG. 68.10     FIG. 68.11     FIG. 68.12

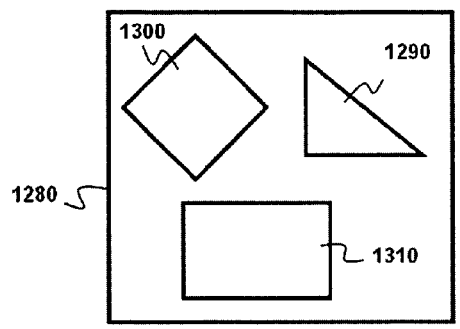
FIG. 72
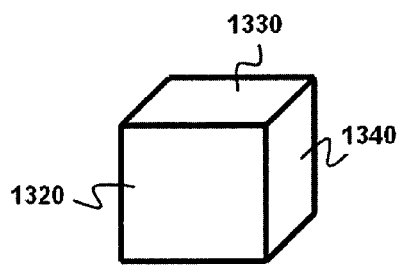
FIG. 73.1
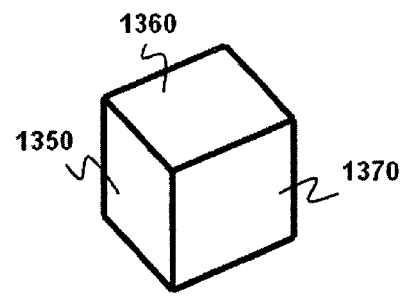
FIG. 73.2
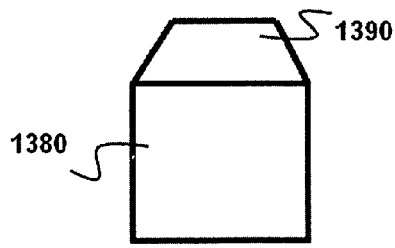
FIG. 73.3
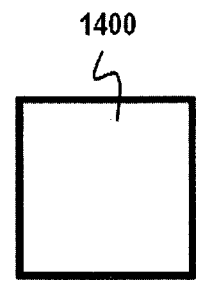
FIG. 73.4

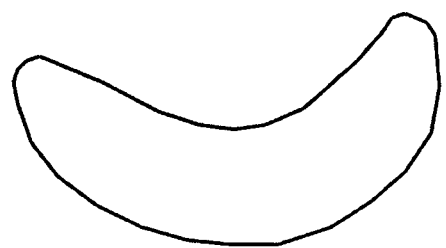
FIG. 78
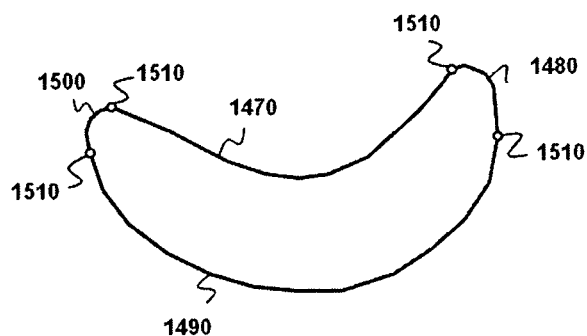
FIG. 79
| Group No. | Angle | Length |
|---|---|---|
| 1 | 150 to 180 | 10x to 14x |
| 2 | 201 to 270 | 3x to 5x |
| 3 | 181 to 200 | 14x to 18x |
| 4 | 201 to 270 | 3x to 5x |
FIG. 80

CONVERTING A DRAWING INTO MULTIPLE MATRICES

CROSS-REFERENCE TO RELATED APPLICATIONS

This application is a Continuation-in-Part of co-pending U.S. patent application Ser. No. 12/072,976, filed Feb. 29, 2008, titled "Graphical Data Mapping Technique", and Ser. No. 12/290,730, filed Nov. 3, 2008, now abandoned titled "3D Windows System", and it claims the benefits of U.S. Provisional Patent Applications No. 61/188,703, filed Aug. 12, 2008, titled "Computer Vision System", No. 61/188,732, filed Aug. 12, 2008, titled "Automated Traffic Control", No. 61/188,731, filed Aug. 12, 2008, titled "Automated Method for Design and Planning", No. 61/188,733, filed Aug. 12, 2008, titled "Automated Code Check for Drawings", No. 61/188,697, filed Aug. 12, 2008, titled "Automated Method to Calculate the Area and Volume", No. 61/197,425, filed Oct. 27, 2008, titled "3D Modeling Method and Technique", No. 61/197,711, filed Oct. 29, 2008, titled "Artificial Visual Brain", and No. 61/203,761, filed Dec. 29, 2008, titled "3D Computer Language".

BACKGROUND

Ever since the introduction of the modern computer in the 1940s, several techniques (algorithms, programming languages, etc.) have been developed to enable the computer to carry out various tasks typically performed by humans; performing complex calculations, processing compound data, and creating detailed graphics are but a few of the examples of such tasks. Despite this tremendous progress witnessed in the field of computing, there remains several human tasks that the computer cannot replicate; there also exists tasks that the computer can barely even aid humans in. Specifically, tasks that require analysis based solely on the presentation of graphical (visual) data have tested the limits of programming languages and have seemingly helped draw the boundaries of human-computer interaction and artificial intelligence.

For example, the representation of a human organ on the computer display or a video of the atrophying or growth of a tumor during an extended period of medical treatment aids the physician in diagnosing the problem. However, in most cases, the computer cannot replicate that physician's diagnosis, nor extract much useful medical information solely based on the aforementioned image or video. Another example would be a virtual simulation of a building collapsing due to an explosion; the simulation aids engineers in analyzing the failures in the structural design of the building, but it is quite difficult to program the computer to perform this analysis in an automated and independent fashion.

In general, the majority of the attempts at increasing the "IQ" of the computer have focused on emulating, through expert systems and artificial intelligence, the way the human brain thinks, through processing and computing. Yet, a critical component to the process has been seemingly overlooked: input. Like the computer, the human requires input, typically in the form of sensory perception. Although the computer can, in varying levels, interpret the classic Aristotelian senses, visual perception, arguably the most important of the senses, remains to be the most elusive.

SUMMARY

The present invention enables the computer system to extract useful information from the graphical data on the computer display such as images, drawings, 3D models, pictures, videos, or the like in a manner that matches or even exceeds human ability. Accordingly, it becomes possible to achieve various tasks that could only be done manually; this saves the user's time and effort and provides more optimized and efficient results. For example, the present invention can be utilized to explore and analyze the visual information in pictures or videos giving textual reports describing such visual information. It can be used to discover defects in pictures, or to detect errors in purposed drawings or designs, providing appropriate graphical corrections for such defects or errors. It can also be employed to generate illustrations or sketches presenting a set of solutions for a design problem.

Generally, the present invention serves a variety of professional applications, such as in the medical field, where it can help physicians more accurately diagnose patients' cases by automating the reading of medical images or pictures. In the engineering field it enables engineers to reach optimal design solutions using more intelligent design methods. In the industrial field it assists manufacturers to improve the quality of their products by utilizing innovative production planning. In computer use the present invention elevates user interaction to a higher level of communication; for example, GUIs can be converted into "intelligent" GUIs that can transform immediately according to the user's needs or preferences. The software becomes more automated achieving various tasks with minimal commands from the user describing his/her requirements. Even the language of interaction between the user and the computer system can be changed into a much simpler language, similar to spoken language.

BRIEF DESCRIPTION OF THE DRAWINGS

FIGS. 20 to 22 are the position of the point of view relative to the x, y, or z-axis.

FIG. 23 is a virtual cube divided by 12 imaginary planes on the computer display.

FIGS. 24.1 to 24.12 are 12 matrices representing the 12 imaginary planes.

FIG. 25 is a table illustrating 12 alternatives for selecting two different axes.

FIGS. 26 and 27 are activating a plurality of intersection points to create a plane.

FIGS. 28 to 30 are activating a plurality of intersection points to create a polygon.

FIG. 31 is a flowchart presenting three successive steps for creating a polygon.

FIG. 32 is a table indicating 6 alternative directions for moving a plane in 3D.

FIG. 33 is a table indicating 6 alternative directions for copying a plane in 3D.

FIG. 34 is a table indicating a position of an intersection point before and after rotation.

FIGS. 48 to 51 are examples for extracting positional information from graphical data.

FIGS. 52 to 57 are examples for extracting dimensional information from graphical data.

FIGS. 68.1 to 68.12 are 12 alternatives for fitting the three spaces together.

FIG. 72 is examples for 2D geometrical shapes that can be identified by the present invention.

FIGS. 73.1 to 73.4 are four different shapes of a cube as it can be seen from different points of view.

FIGS. 78 and 79 are two technical steps to identify an organic object.

FIG. 80 is a database describing the boundary lines of the organic object.

DETAILED DESCRIPTION

Intuitive Virtual Creation

Figure 1:
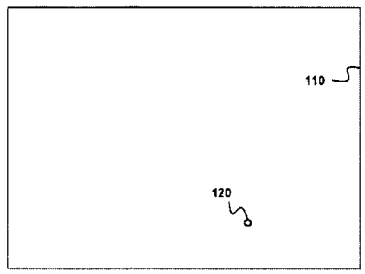
FIGS. 1 to 10 are creating a 3D GUI on the computer display.
Figure 2:
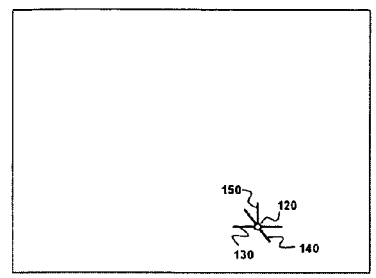
Figure 3:
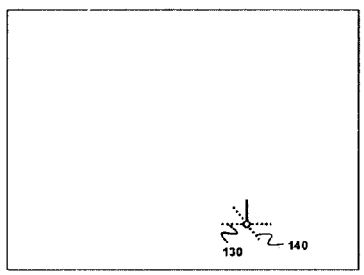

The present invention enables the user to easily provide an input to the computer system representing a 2D or 3D graphical datum that is further converted into informative graphical data whereby the computer system becomes able to extract useful information from this informative graphical data. Utilizing an innovative algorithm that avoids using complex mathematical calculations enables achieving different tasks in an automated manner. For example, FIG. 1 illustrates a computer display 110 where a small circle 120 appears at the position of the cursor during its movement on the computer display. FIG. 2 illustrates an x-axis 130, a y-axis 140, and a z-axis 150 that appear on the computer display at the position of the small circle when the user clicks on it. FIG. 3 illustrates selecting the x-axis and the y-axis by clicking on both of them where selecting the x-axis and y-axis indicates the user's need to create a plane parallel to the xy-plane on the computer display.

Figure 4:
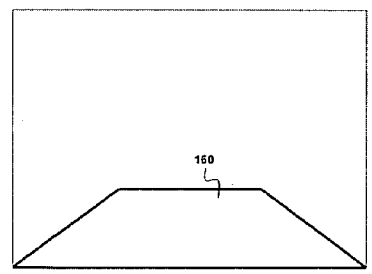
Figure 5:
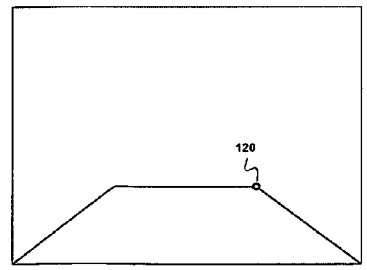
Figure 6:
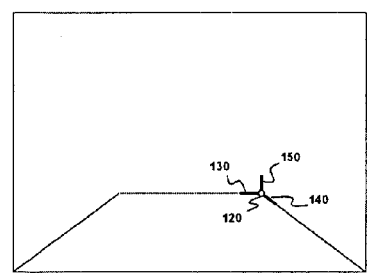
Figure 7:
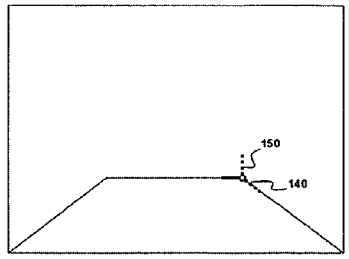
Figure 8:
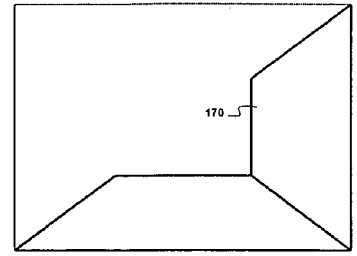

Once the user clicks on the mouse's left button while the cursor is away from the position of the x, y, and z-axis, a plane 160, parallel to the xy-plane, appears on the computer display as illustrated in FIG. 4. FIG. 5 illustrates moving the cursor to a corner of the newly created plane where a small circle 120 appears at the position of the cursor. FIG. 6 illustrates an x-axis 130, a y-axis 140, and a z-axis 150 that appear at the position of the small circle when the user clicks on it. At this moment, the user can choose to create a plane parallel to the xy, yz, or xz-plane by selecting two axes of the x, y, and z-axes. For example, FIG. 7 illustrates selecting the y-axis 140 and the z-axis 150 to indicate the user's need to create a plane parallel to the yz-plane. FIG. 8 illustrates a plane 170 parallel to yz-plane that appears on the computer display when the user clicks on the mouse's left button while the cursor is away from the x, y, and z-axes.

Figure 9:
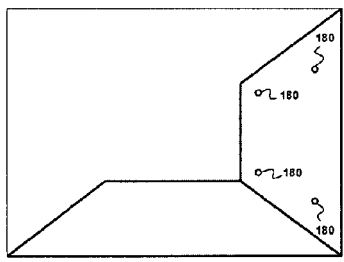
Figure 10:
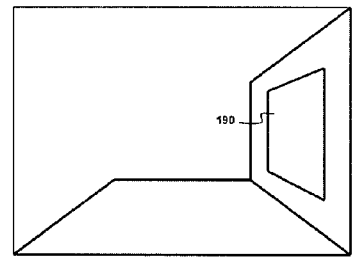

To create a polygon on the computer display, the user successively selects a number of small circles that represent the positions of the polygon's vertices. For example, FIG. 9 illustrates four small circles 180 that appear on the computer display when the user successively clicks on each one of them after moving the cursor to their positions. FIG. 10 illustrates a polygon 190 that appears on the computer display connecting between the positions of the four small circles when the user clicks the mouse's left button while the cursor is away from the small circles. Generally, the user can select any plane or polygon on the computer display by double clicking the mouse's left button, while the cursor is located on the plane or the polygon that needs to be selected. Selecting a plane or a polygon on the computer display is usually done to achieve further processes such as deleting, moving, copying, or rotating the plane or the polygon on the computer display.

To delete a plane or a polygon on the computer display, the user selects the plane or the polygon that needs to be deleted, then clicks the mouse's right button, or presses on the "delete" button on the computer keyboard. To move a plane or a polygon in 3D on the computer display, the user selects the plane or the polygon that needs to be moved, then moves the cursor to a base point located on the plane or the polygon where a small circle and an x, y, and z-axis appear at the position of the base point. The user can drag the base point parallel to the x, y, or z-axis using the mouse's left button to move the selected plane or polygon along the x, y, or z-axis on the computer display.

Figure 11:
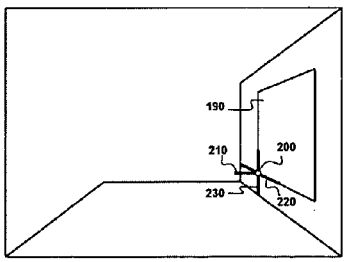
FIGS. 11 to 17 are editing the GUI using the present invention.
Figure 12:
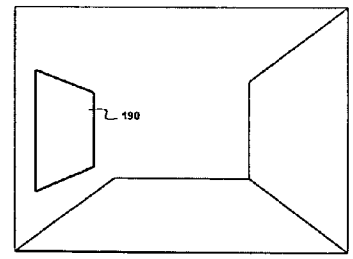

For example, FIG. 11 illustrates selecting the polygon 190 then moving the cursor to a base point at a corner of the polygon, where a small circle 200 and an x-axis 210, a y-axis 220, and a z-axis 230 appear at the position of the base point. In this case, dragging the base point parallel to the x, y, or z-axis moves the polygon, respectively, along the x-axis, the y-axis, or the z-axis on the computer display. FIG. 12 illustrates moving the polygon along the negative x-axis by dragging the base point from "right" to "left", parallel to the x-axis using the mouse's left button. It is important to note that most of the x, y, and z-axes that appear on the computer display are comprised of a positive-axis and a negative-axis, where the small circle is located between these positive and negative axes to represent the position of the origin of the Cartesian coordinate system. Dragging a base point along an axis can be in a positive direction or in a negative direction according to the cursor movement on the computer display.

Figure 13:
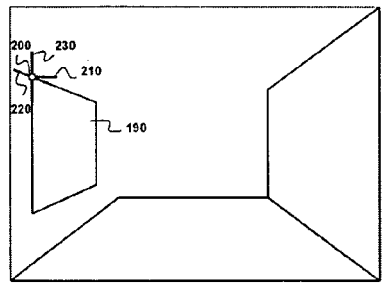

The main function of the x, y, and z-axes that appear at the position of the small circle is to present the directions of the x, y, and z-axes of the Cartesian coordinate system at the position of the small circle on the computer display. As shown in the previous figures, each small circle has its unique x, y, and z-axes according to its relative position to the vanishing point of the perspective. Some axes that appear at some small circles are comprised only of a positive axis or a negative axis according to their positions on the computer display. However, to copy a plane or a polygon on the computer display the user selects the plane or the polygon that needs to be copied then chooses a base point to drag a copy of this plane or polygon to a specific position in 3D on the computer display. FIG. 13 illustrates selecting the polygon 190 then moving the cursor to a base point at a corner of the polygon where a small circle 200 and an x-axis 210, a y-axis 220, and a z-axis 230 appear at the position of this base point on the computer display.

Figure 14:
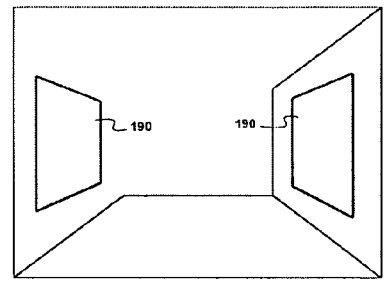
Figure 15:
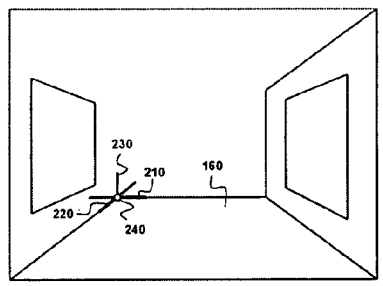

FIG. 14 illustrates dragging the cursor from "left" to "right" along the positive x-axis using the mouse's right button to locate the polygon's copy 200 at a new 3D position on the computer display. It is important to note that the steps of moving and copying planes or polygons on the computer display are similar except during dragging, where the mouse's left button is used to move the planes or the polygons while the mouse's right button is used to copy the planes or the polygons. To rotate a plane or a polygon about the x, y, or z-axes, the user selects the plane or the polygon that needs to be rotated, then selects a base point where a small circle and an x-axis, a y-axis, and a z-axis appear at the position of the base point where the user can rotate any of the x, y, or z-axes about the small circle to rotate the plane or the polygon about the x, y, or z-axis. For example, FIG. 15 illustrates selecting the plane 160 and a base point 240 at a small circle where an x-axis 210, a y-axis 220, and a z-axis 230 appear at the position of this base point.

Figure 16:
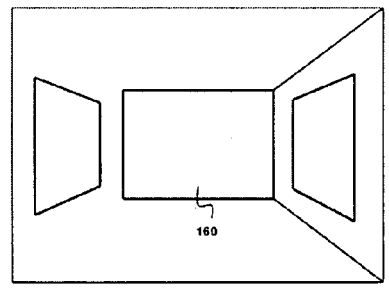

FIG. 16 illustrates rotating the plane 90 degrees about the x-axis by rotating the positive y-axis about the small circle to be aligned with the positive z-axis. If the positive y-axis is rotated to be aligned with the negative y-axis or the negative z-axis that means the plane will be, respectively, rotated 180 degrees, or 270 degrees about the x-axis. In a similar manner, the user can rotate the plane about the y-axis by rotating the x-axis or the z-axis about the y-axis, and also can rotate the plane about the z-axis by rotating the x-axis or the y-axis about the z-axis on the computer display.

Figure 17:
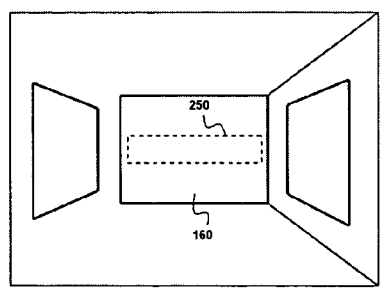

Another tool that is important, in addition to the previously described tools, is to enable the user to classify the planes or the polygons on the computer display. This is achieved by double clicking the mouse's right button while the cursor is located on the plane or the polygon that needs to be classified, whereby a text box appears on the computer display, where the user can type the ID of the plane or the polygon in this text box. For example, FIG. 17 illustrates selecting the plane 160 by double clicking the mouse's right button while the cursor is located on the plane, where a text box 250 appears on the computer display: In this example, the user may type "wall/meeting room/main building" in the text box to indicate that the selected plane represents a wall of a meeting room in a main building. This manner of classifying or identifying the planes or the polygons on the computer display enables the user to interact with them in an innovative manner as will be described subsequently.

Figure 18:
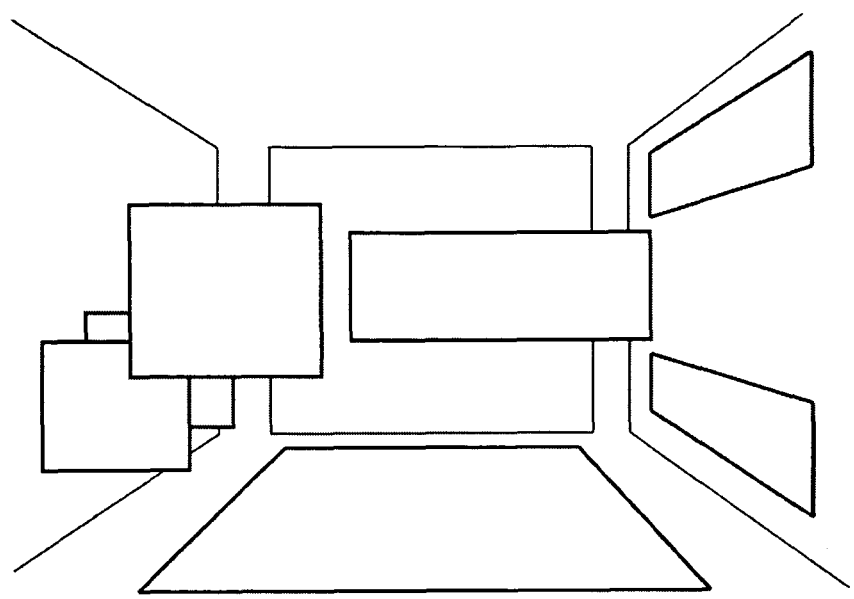
FIGS. 18 and 19 are two examples of 3D GUIs created by the present invention.
Figure 19:
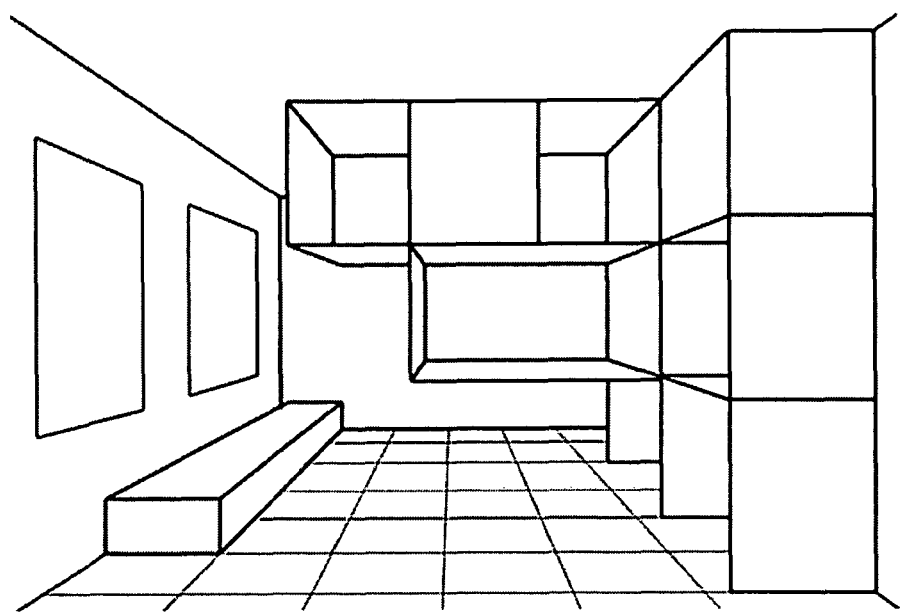

Generally, using the previously described tools to create, select, delete, move, copy, rotate, or classify planes or polygons enables the user to create 3D GUIs or 3D models on the computer display for various purposes. For example, FIG. 18 illustrates a 3D GUI comprised of a plurality of planes positioned in 3D on the computer display, while FIG. 19 illustrates a 3D model of an interior space that is created on the computer display using another plurality of planes.

Matrices Modeling

The present invention presents the visual data on the computer display by utilizing a virtual cube that is divided by a plurality of small circles, where the user is assumed to be looking at the center of the virtual cube and the small circles are projected on the computer display in a hidden fashion until the cursor is moved to the position of one of them. FIG. 20 illustrates the virtual cube 260 that has six surfaces parallel to the xy, yz, and xz-planes where the center 270 of the virtual cube is located on the origin of the Cartesian coordinate system. Point 280 represents the point of view where the sight line passes by the cube's center. FIG. 21 illustrates changing the location of the point of view where its new position is represented by the three components r, θ, and φ of the spherical coordinate system. As shown in the figure, "r" represents the distance between the point of view and the origin, "θ" is the angle between the positive x-axis and the line from the origin to the point of view projected into the xy-plane, and "φ" is the angle between the z-axis and the line from the origin to the point of view.

FIG. 22 illustrates a projected plane 290 representing the computer display where this projected plane is positioned to be perpendicular to the sight line. As shown in the figure, the new Cartesian coordinate system has the new x-axis passing by the sight line, in addition to the new y-axis and the new z-axis being located on the projected plane. The following equations represent transferring the x, y, and z coordinates of a point located inside the virtual cube into the new coordinates according to the projection plane:

$$P_{newx} = \cos(\theta)\sin(\phi)P_x + \sin(\theta)\sin(\phi)P_y + \cos(\phi)P_z$$

$$P_{newy} = \sin(\theta)P_x + \cos(\theta)P_y$$

$$P_{newz} = \cos(\theta)\cos(\phi)P_x - \sin(\theta)\cos(\phi)P_y + \sin(\phi)P_z$$

In the previous equations, Px, Py, and Pz represent the coordinates of the original Cartesian coordinate system of the point, while the Pnewx, Pnewy, and Pnewz represent the coordinates of the new Cartesian coordinate system of the point. To compute the coordinates of the projection of the point onto the projected plane, the following formula is used.

$$[P_{newx}, P_{newy}, P_{newz}] \text{ is projected onto:} [(r)(P_{newy})/(r-P_{newx}), (r)(P_{newz})/(r-P_{newx})]$$

The virtual cube can be divided by a plurality of imaginary planes that are positioned equally apart from each other parallel to the xy, yz, or xz-plane, where each three of said imaginary planes meets at an intersection point. For example, FIG. 23 illustrates dividing the virtual cube by four imaginary planes parallel to the xy-plane, four imaginary planes parallel to the yz-plane, and four imaginary planes parallel to the xz-plane. The imaginary planes intersect with each other at a number of intersection points or small circles 300, where the intersection between the imaginary planes divides each one of them into a number of squares or units of division 310. In this example, as shown in the figure, the virtual cube is projected onto the computer display to appear as one-point perspective where the value of "θ" is 90 degree, the value of "φ" is 90 degree, and the value of "r" is 4 units, while the distance between each two successive imaginary planes is one unit.

Based on the previous equations FIGS. 24.1 to 24.12 illustrate 12 matrices representing the virtual cube where each cell of the 12 matrices indicates the position of an intersection point or a small circle projected onto the computer display, and the plane that the small circle is located on. The four matrices of FIGS. 24.1 to 24.4 represent the four imaginary planes that are parallel to the xy-axis, the four matrices of FIGS. 24.5 to 24.8 represent the four imaginary planes that are parallel to the yz-axis, and the four matrices of FIGS. 24.9 to 24.12 represent the four imaginary planes that are parallel to the xz-axis. Each cell in each matrix indicates two datums in two triangles; the first datum in the top triangle represents the projection coordinates of the intersection point or the small circle on the computer display, while the second datum in the bottom triangle represents a default ID for a potentially created plane. The default ID changes to the ID that the user provides when s/he classifies the created plane as previously described.

There is a small square located between each four cells of a matrix indicating the distance between the point of view and the midpoint of a unit of division 310. The midpoint of the unit of division is the arithmetical average of the corresponding coordinates of the four intersection points that are located on the vertices of the unit of division. To project a number of planes on the computer display, each plane is projected as a plurality of units of division in descending order according to the distance value in the small squares. In other words, the units of division that are located away from the point of view are projected on the computer display before the more proximal units of division.

Matrices Algorithm

The matrices modeling enables the user to create, select, delete, move, copy, or rotate planes or polygons on the computer display using simple algorithms that avoid utilizing complex mathematical calculations which eases the manipulation and the interaction with the 3D objects on the computer display. As described previously, the intersection points do not appear on the computer display until the cursor is moved to a position of one of them where a small circle is presented at this position. When the user clicks on the small circle the x-axis, the y-axis, and the z-axis at the position of the intersection point are presented on the computer display. The x, y, and z-axes are simply created by drawing lines connecting between the position of the selected intersection point and the positions of the adjacent intersection points in the virtual cube, or matrices.

To create a plane, the user clicks on two axes to indicate his/her need to create a plane parallel to these two axes. For example, clicking on the positive y-axis and the negative z-axis indicates the user's need to create a plane parallel to the yz-plane starting from the position of the small circle in the direction of the positive y-axis and the negative z-axis. FIG. 25 illustrates a table indicating 12 alternatives for selecting two axes to create a plane. For example, in this table, the first alternative indicates selecting the positive x-axis and the positive y-axis which means creating a plane parallel to the xy-plane starting from the (x, y, z) coordinates of the selected intersection point and including all the intersection points that are successively located between the positive x-axis and the positive y-axis starting from the selected intersection point to the boundary of the virtual cube. In this case, the units of division of the created plane will be drawn on the computer display to present the created xy-plane.

As shown in the table, adding "+1" or "−1" to the x, y, or z-axis means moving successively on the positive direction or the negative direction of the x, y, or z-axes starting from the coordinates of the selected intersection point to the boundary of the virtual cube to include all the intersection points that are located between the two selected axes. Adding "0" to the x, y, or z-axis means including no intersection points along the x, y, or z-axes which always happens to the axis that is perpendicular to the created plane. FIG. 26 illustrates an example for creating a plane where the positive x-axis 320 and the positive y-axis 330 are selected at a position of an intersection point 340. FIG. 27 illustrates creating an xy-plane including a plurality of intersection points 350 represented by black circles and located between the positive x-axis and the positive y-axis starting form the selected intersection point 340 and ending at the boundary of the virtual cube.

FIG. 28 illustrates an example for creating a polygon by selecting a number of small circles or intersection points 360 that represent the vertices of the selected polygon. FIG. 29 illustrates an automated selection for the intersection points 370 that are located on the boundary lines of the polygon between each two successive vertices. FIG. 30 illustrates an automated selection for the intersection points 380 that are located along an axis between each two successive parallel boundary lines of the polygon to create the selected polygon. Generally the previous three figures illustrate the three steps of creating a polygon on the computer display whereas FIG. 31 illustrates a flowchart describing these three steps. As shown in the figure, the first step is to select or activate the intersection points (IPs) that represent the polygon's vertices that are indicated by the user's selection of the small circles. The second step is to automatically select or activate the intersection points (IPs) that are located on the boundary lines of the polygon between each two successive vertices. The third step is to automatically select or activate the intersection points (IPs) that are located inside the polygon along an axis between each two successive parallel boundary lines of the polygon.

As described previously, to select a plane or a polygon on the computer display, the user double clicks on a point located on the plane or the polygon away from the intersection points. The position of the clicked point will always be located on a unit of division that carries an ID of a plane or a polygon, where this ID indicates the ID of the selected plane or polygon. Selecting a plane or a polygon is a basic step to delete, move, copy, rotate, or classify the plane or the polygon. As described previously, to delete a selected plane, the user presses on the "Delete" button on the computer keyboard, or clicks the mouse's right button. In this case, the intersection points of the deleted plane or polygon will be deactivated which means deleted from the matrices cells.

To move a selected plane or polygon, the user drags a base point on the computer display to provide the computer system with an input representing the direction and the distance of movement. In this case the IDs of the moved plane or polygon are transferred from one matrix to another according to the user's input. FIG. 32 illustrates a table indicating six alternatives for moving a selected plane along the positive or negative x, y, or z-axis, where "d" represents the distance of movement. As shown in the table, the new coordinates of the intersection points (PIs) of the moved plane or polygon after the movement are changed according to the direction and the distance of the movement.

To copy a selected plane or polygon to another position, the user provides an input to the computer system representing the direction and distance of copying the original plane. FIG. 33 illustrates a table indicating six alternatives for copying a plane where the position of the copied plane depends on its direction and distance relative to the original plane. To rotate a selected plane or polygon about an axis the user provides an input to the computer system representing the base point of the rotation, the axial of rotation, and the value of the rotational angle. FIG. 34 illustrates a table indicating the start and end positions of an intersection point that is located in a rotated plane or polygon, where the end position of the intersection point after the rotation depends on its original position, the position of the base point, the axial of rotation, and the value of the rotational angle.

As described previously, it is possible to classify a plurality of planes or polygons as one group by giving them the same ID. This function enables the user to simultaneously select, delete, move, copy, or rotate a group of planes or polygons on the computer display. Moreover, classifying a group of planes or polygons is utilized in other vital applications as will be described subsequently.

2D Informative Graphical Data

Figure 35:
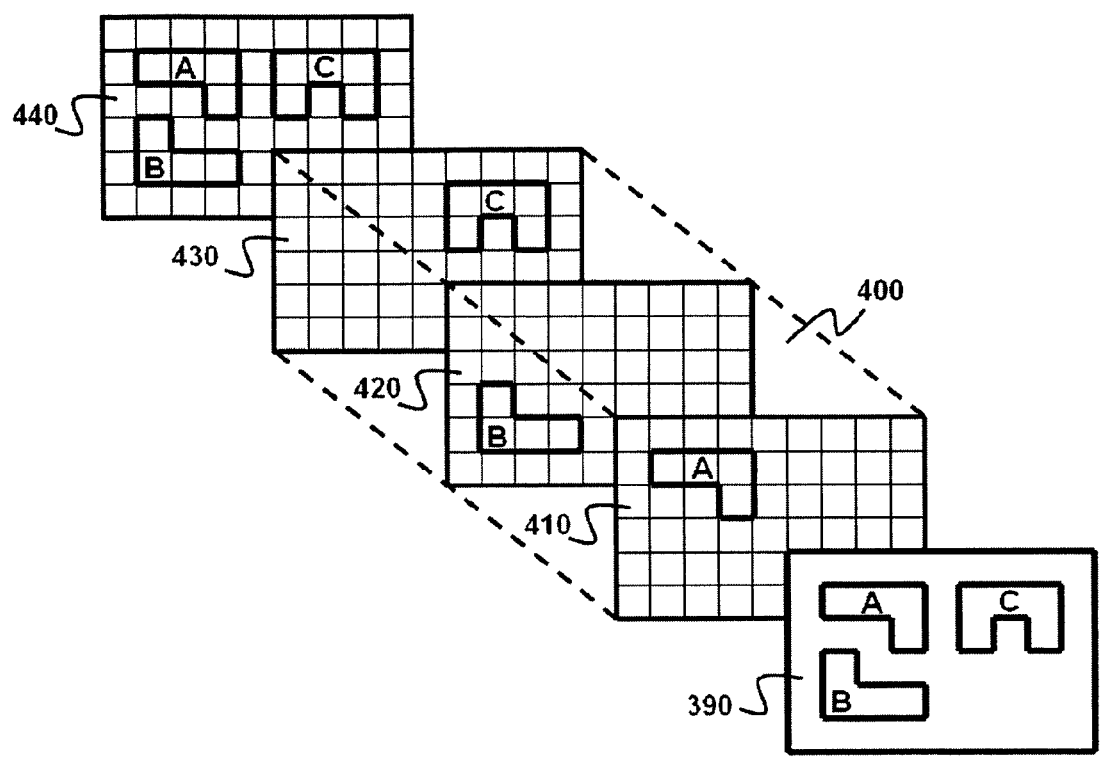
FIG. 35 is a number of matrices representing two-dimensional graphical data.

Generally, the present invention technique deals with both two-dimensional (2D) and three-dimensional (3D) graphical data; in both cases, the technique revolves around transforming the graphical data into information so that the computer system can perceive the graphical data as a human would. The resultant of this transformation will be called "Informative Graphical Data." FIG. 35 illustrates the concept when dealing with the 2D graphical data, where as shown in the figure, 2D graphical data 390 is presented on the computer display comprising of three objects A, B, and C. Such 2D graphical data can be represented by a group of individual matrices 400 where each matrix of said group of individual matrices represents one object of the 2D graphical data. For example, matrix 410 represents object A, matrix 420 represents object B, and matrix 430 represents object C. Matrix 440 is a collective matrix that represents all the objects of the 2D graphical data, where said collective matrix is the result of adding the individual matrices to each other in one matrix.

Generally, to create 2D informative graphical data on the computer display using the present invention, objects are theoretically positioned in the virtual cube on a number of xy, xz, or yz-planes, where each plane includes the same objects that have the same classification or ID. In these cases, theoretically positioning a virtual camera perpendicular to these planes enables seeing the entire 2D informative graphical data in one scene. For example, according to FIG. 35, objects A, B, and C are positioned on three successive xz-planes where the line of sight of the viewer is located parallel to the y-axis which means positioning the virtual camera perpendicular to the xz-planes. Positioning the objects of the 2D graphical data on a number of parallel planes or layers and then representing these parallel planes with a number of individual matrices, in addition to the collective matrix that represents all the objects of the 2D graphical data, enables the computer system to extract useful information from the 2D informative graphical data as will be described subsequently.

3D Informative Graphical Data

Figure 36:
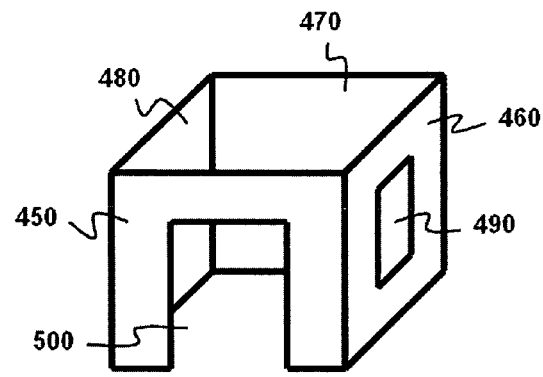
FIG. 36 is a 3D model representing an architectural space on the computer display.
Figure 37:
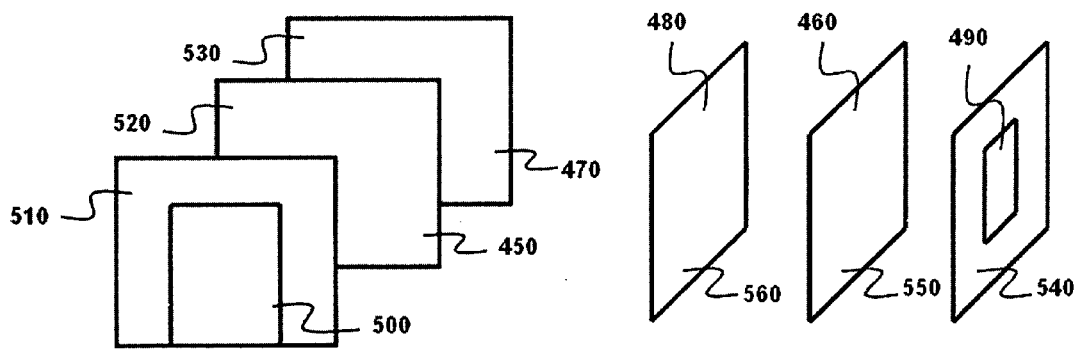
FIG. 37 is converting the 3D model into a plurality of vertical and horizontal planes.

The concept of 3D informative graphical data such as 3D models is to consider each plane of the 3D model as 2D informative graphical data that is represented by a number of individual matrices and a collective matrix. For example, FIG. 36 illustrates a 3D model of an architectural space comprised of a first wall 450, a second wall 460, a third wall 470, a fourth wall 480, a window 490, and a door opening 500. FIG. 37 illustrates positioning the door opening on a first xz-plane 510, the first wall on a second xz-plane 520, and the third wall on a third xz-plane 530, while positioning the window on a first yz-plane 540, the second wall on a second yz-plane 550, and the fourth wall on a third yz-plane 560. The distance between the first xz-plane and the second xz-plane is zero, and the distance between the first yz-plane and the second yz-plane is also zero to enable viewing the 3D model on the computer display as it appears in FIG. 36.

Each plane of FIG. 37 is represented by an individual matrix while each group of planes, where the distance between them is zero, is also represented by one collective matrix. For example, each plane of the six planes of FIG. 37 will be represented by an individual matrix while a collective matrix will represent the first xz-plane and the second xz-plane of the door opening and the first wall, and another collective matrix will represent the first yz-plane and the second yz-plane of the window and the second wall. Converting the 3D model in this fashion of matrices modeling or layering enables the computer system to extract useful information from the 3D informative graphical data as will be described subsequently.

Pictures Conversion Technique

An alternative case to informative graphical data would be non-informative graphical data, or graphical data that was developed or created without using the aforementioned matrices modeling or layers where such non-informative graphical data can be transformed into informative graphical data using a technique called the "major color technique". Said major color technique depends on identifying the objects in pictures, images, or the like by recognizing the unique color of each type of objects. It is usually used with digital pictures or with the raster graphics images or bitmap.

Figure 38:
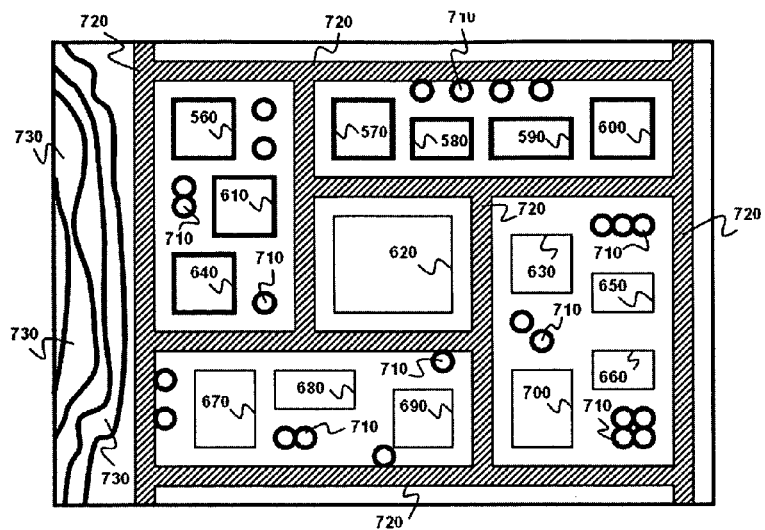
FIG. 38 is a GIS image representing a site plan on the computer display.

For example, FIG. 38 illustrates a GIS image with 2D non-informative graphical data of a site presented on a computer display. The GIS image is comprised of a number of red rectangles 560 to 700 representing 15 buildings, a plurality of green circles 710 representing trees, black or striped spots 720 representing streets, and a plurality of contour lines 730 in a yellow area representing a mountain. To convert the GIS image into 2D informative graphical data the user provides the present invention with the indication of each different color of the GIS image. For example, red is an indication for buildings, green is an indication for trees, black is an indication for streets, yellow is an indication for mountains, and other colors are an indication for empty spots of land. At this level, the present invention can automatically convert the GIS image into 2D informative graphical data using the following four technical steps.

The first technical step is to divide the GIS image by a plurality of horizontal lines and vertical lines that are positioned equally apart from each other. The horizontal lines represent xz-planes and the vertical lines represent yz-planes, where the GIS image is assumed to be positioned parallel to the xy-plane. Each intersection between a horizontal line and a vertical line represents an intersection point, and each square located between two successive horizontal lines and two successive vertical lines represents a unit of division.

The second technical step is to define the color ID of each intersection point by finding the major color. This is defined as the color that is repeated more than other colors in the pixels of the square of the unit of division that the intersection point is located on, typically one of its vertices. For example, if "R" indicates red for buildings, "G" indicates green for trees, "B" indicates black for streets, "Y" indicates yellow for mountains, "O" indicates other colors than red, green, black, or yellow, for empty spots of land, then each intersection point will have one or more IDs (R, G, B, Y, or O) according to which unit(s) of division it is located on. In case of locating an intersection point on more than one unit of division that have more than one color, the intersection point will have more than one ID.

The third technical step is to form a number of individual matrices where each one of said individual matrices represents objects of the GIS image that have the same ID. This is achieved by separating the intersection points that have the same ID in an individual matrix. The intersection points that have multiple IDs will be located in more than one individual matrix where each one of these individual matrices will include one ID of multiple, intersection point IDs. For example, if there is a building and a tree located adjacent to each other in the GIS image where a point of intersection is shared, this point of intersection will have the two ID's R and G that respectively represent the building and the tree. Accordingly this intersection point will be located in both the individual matrix that represents the buildings and the individual matrix that represents the trees.

The fourth technical step is to form a collective matrix representing all the objects of the GIS image where each cell of the collective matrix represents one intersection point that may carry one or more IDs. At this level the GIS image of the site is converted into 2D informative graphical data where the present invention can simply extract useful information from it according to the user's needs or requirements as will be described subsequently.

Drawings Conversion Technique

Many drawings utilize the vector graphics format that uses geometrical primitives such as points, lines, curves, and polygons represented by a plurality of mathematical equations. Vector graphics formats are complementary to raster graphics formats that use an array of pixels, as it is typically common in digital pictures. However, such drawings are an example of 2D non-informative graphical data that can be converted into 2D informative graphical data using a technique called "intersectional technique". Said intersectional technique is based on finding the points or nodes of intersections between the lines, curves, or polygons of each object of the drawing and the xy, yz, and xz-planes of the virtual cube, then approximating said nodes of intersections to a number of intersection points of the virtual cube that are located close to said nodes of intersections to represent said lines, curves, or polygons.

Figure 39:
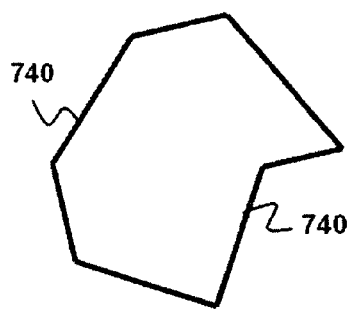
FIGS. 39 to 42 are converting a drawing into informative graphical data.
Figure 40:
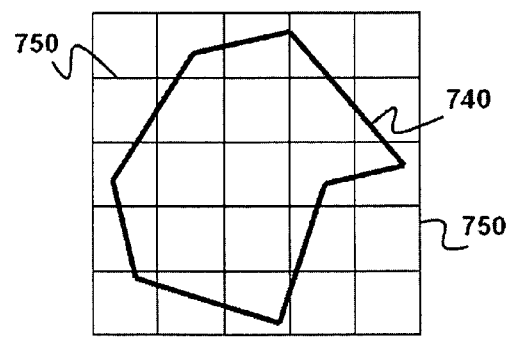
Figure 41:
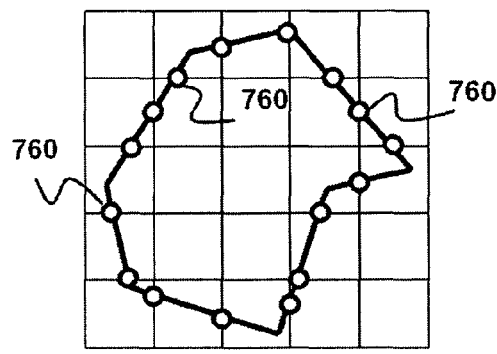
Figure 42:
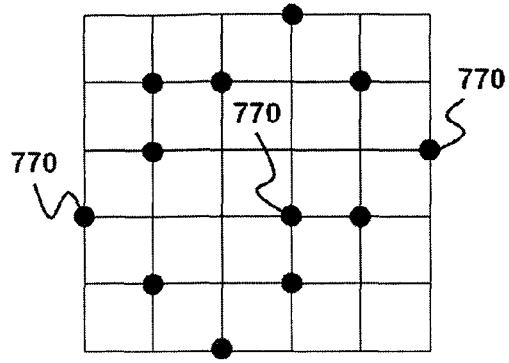

For example, FIG. 39 illustrates a polygon presented on the computer display comprised of seven lines 740. FIG. 40 illustrates a top view for positioning the polygon on an xy-plane inside the virtual cube where the horizontal lines and the vertical lines 750 represent the xz-planes and the yz-planes of the virtual cube. FIG. 41 illustrates the nodes of intersections 760 between the polygon lines, and the horizontal lines and the vertical lines. FIG. 42 illustrates a number of intersection points 770 of the virtual cube representing the nodes of intersections. Accordingly, the plurality of the intersection points 770 of the virtual cube represents the polygon, or in other words, the polygon is converted from 2D non-informative graphical data into 2D informative graphical data.

Figure 43:
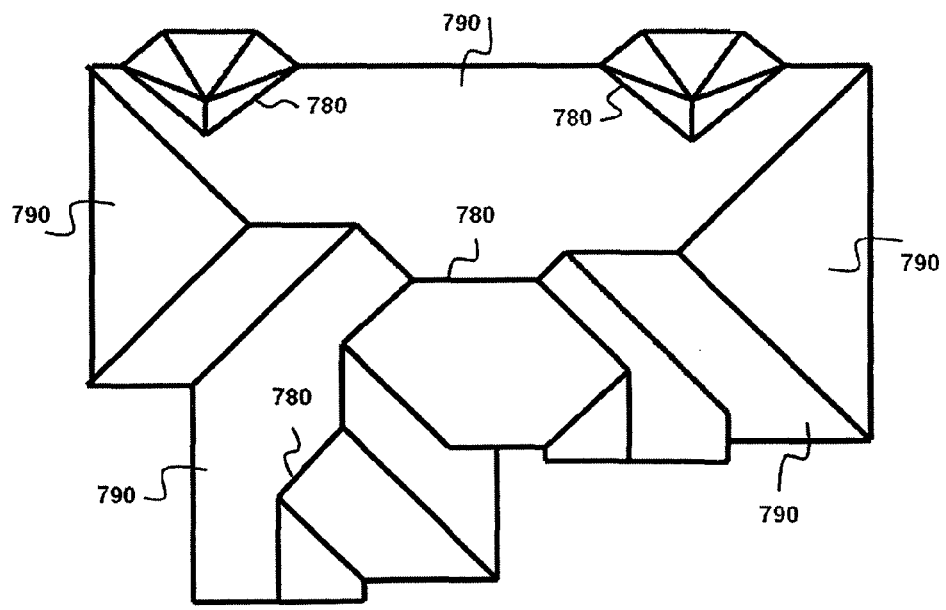
FIG. 43 is a roof plan of a building comprised of a plurality of lines.

FIG. 43 illustrates a more complex example of a drawing representing a roof plan of a building comprised of a plurality of lines 780 that form a number of polygons 790. Using the previously described technical steps enables converting this drawing into 2D informative graphical data where the computer system can simply extract useful information regarding the details of this roof plan according to the user's needs or requirements.

However, it is important to note that in some cases during using the present invention, the user may need to draw a polygon on top of each object in the drawing to clearly identify each one of the drawing objects or lines. This is in cases where there is a need to provide the object's IDs to the present invention, or if the drawing lines are unclear or obscured by confusing or additional lines as in the case of most engineering drawings. In this case, it is possible to have a plurality of icons on the graphical user interface on the computer display where each one of these icons carries a unique ID, whereas clicking on a specific icon of said plurality of icons then drawing a polygon on the drawing lines indicates that this polygon or these drawing lines will carry the ID of the clicked icon.

3D Models Conversion Technique

Figure 44:
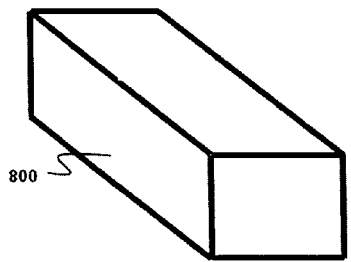
FIGS. 44 to 47 are slicing a 3D model with vertical and horizontal planes.
Figure 45:
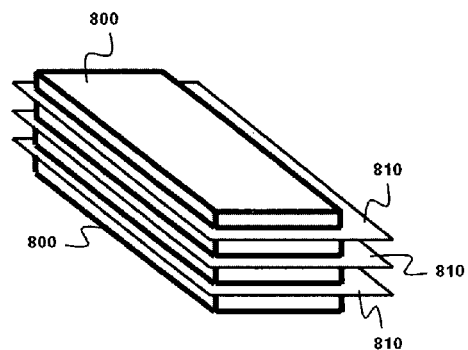
Figure 46:
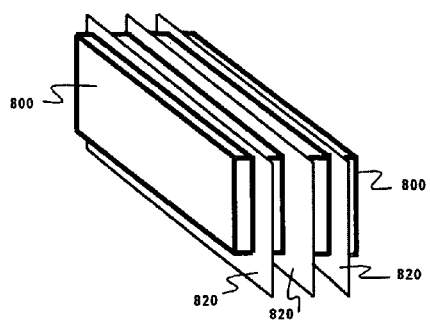
Figure 47:
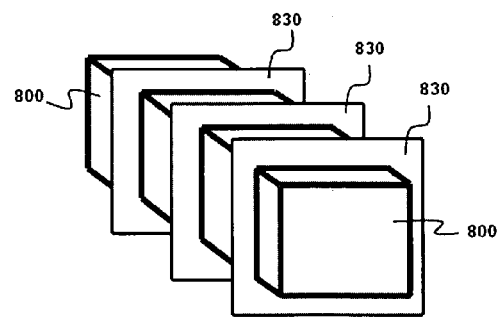

Most 3D models utilize the polygonal modeling technique where the 3D model is represented or its surfaces approximated by using a collection of polygons. Such 3D models are an example of the 3D non-informative graphical data that can be converted into 3D informative graphical data using a technique called "3D slicing technique". Said 3D slicing technique is based on slicing the 3D model by a number of planes parallel to the xy, yz, and xz-planes of the virtual cube. In other words, the 3D model is positioned inside the virtual cube to intersect with its imaginary planes that are parallel to the xy, yz, and xz-planes. For example, FIG. 44 illustrates a prism 800 created on the computer display using the polygonal modeling technique. To create the matrices model that represents the 3D model of the prism, the present invention slices the prism by three groups of imaginary planes. The first group of imaginary planes 810 is parallel to the xy-plane as illustrated in FIG. 45, the second group of imaginary planes 820 is parallel to the yz-plane as illustrated in FIG. 46, and the third group of imaginary planes 830 is parallel to the xz-plane as illustrated in FIG. 47.

Each imaginary plane is comprised of a plurality of vertical and horizontal lines that are positioned equally apart from each other to intersect at a number of intersection points. Each point or joint of intersection between a prism surface and the vertical or the horizontal lines is computed and represented by the closest intersection point to it indicating an ID representing the prism surface. Each xy, yz, and xz-plane will be represented by an individual matrix, in cases where more than one object type is located on the same plane, a number of individual matrices equal to the number of the objects types are formed where each one of said individual matrices represents one object type. A collective matrix is also formed to represent the different objects that are located on the same plane. At this level, the 3D model is converted into 3D informative graphical data where the present invention can extract useful information from it according to the user's needs or requirements.

Extracting Positional Information

The present invention enables the computer system to extract useful information from the informative graphical data on its display. Said useful information can be positional information describing the locations of the graphical data objects relative to each other. For example, FIG. 48 illustrates an example of an image with 2D informative graphical data 840 comprised of four shapes or objects classified with four IDs: "A"; "B"; "C"; and "D". Object "A" is located on a first xy-plane, object "B" is located on a second xy-plane, object "C" is located on a third xy-plane, and object "D" is located on a fourth xy-plane. Each intersection point in a plane indicates an ID representing the object that the intersection point is located on, such as A, B, C, or D, or it contains "0" where the figure zero represents locating the intersection point on no objects of the four objects. Each one of the four xy-planes is represented by an individual matrix where each cell in each individual matrix represents one intersection point. The four objects are also represented by a collective matrix where some cells of this collective matrix include more than one ID at overlapping positions of two of the four objects.

At this level, the present invention can help the user to analyze the positions of the four objects relative to each other by comparing the IDs of the cells of the individual matrices and the collective matrix. For example, if the user needs to find the objects that overlap with each other, the computer system searches the cells of the collective matrix that include more than one ID. In this case, the computer system will find that objects "A" and "B", and objects "B" and "D" overlap with each other. To achieve such a task, the user has two communication options to interact with the present invention. The first option is to provide the present invention with a "descriptive command" that describes in a programming language the steps of finding the objects' IDs that are located together in the same cell in the collective matrix. The second option is to provide the present invention with a "reference command" that indicates a title associated with a descriptive command that is previously programmed. For instance, in this example the title "list of overlapped objects" can be used as a reference command.

It is important to note that, for the same application, the number of the needed descriptive commands is limited; these descriptive commands can be titled to be used later as reference commands for simpler and faster interaction. Giving the user the ability to program his/her own unique commands and convert these unique commands from descriptive commands into reference commands eases the interaction process for the user when s/he deals with repetitive tasks. However, in the previous example, if the user needed to find the perimeter of each object that has a direct, unimpeded view to the south or the bottom boundary line of the image, a descriptive command would be created to describe the process of finding the first cell in each column in the collective matrix that includes A, B, C, and/or D starting from the downward columns. If the user gave this descriptive command a title such as "objects with direct view to the south" then s/he can later use this title as a reference command.

FIG. 49 illustrates another example of 2D informative graphical data comprised of a first object 850, a second object 860, a third object 870, and a fourth object 880 separated from each other by a fifth object 890. In this example, if the user needs to provide a descriptive command to the present invention to identify the parts of the fifth object that are located between two other objects. The user will describe the steps of finding the adjacent group of cells that carry an ID representing the fifth object and are successively laid horizontally or vertically in the collective matrix between two cells containing two other different IDs. In this case, the present invention will define the parts that are marked with a small grid in FIG. 50 as an indication for meeting the user's aforementioned requirement. Also, if the user needs to provide a descriptive command to the present invention to identify the object/s that are directly adjacent to more than two other objects, the user will describe the steps for searching the cells of the collective matrix that include more than one ID, then compare these IDs to find the same ID that is found with more than two other IDs in one or more cells. In this case the computer system will identify the fourth object 880 and the fifth object 890 as two objects meeting the user's aforementioned requirement.

Figure 51:
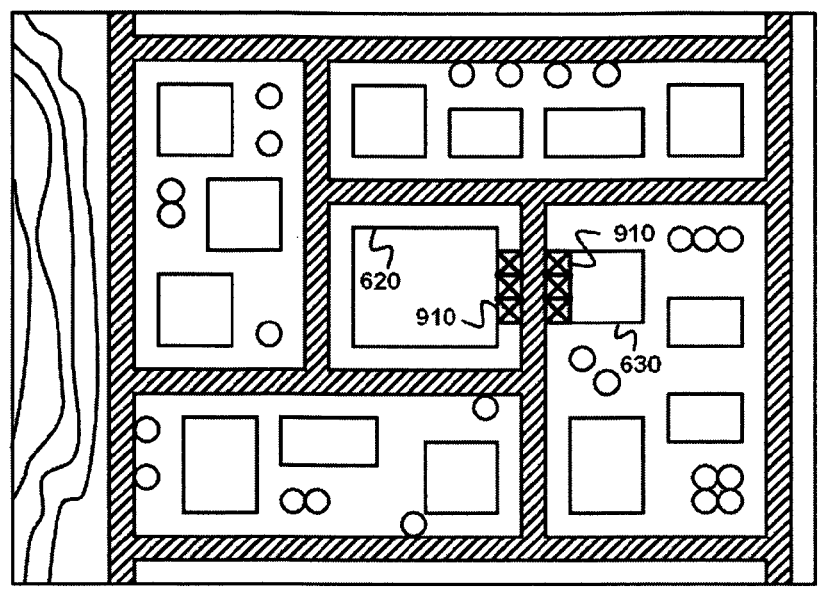

If the user needed to define the spots in the site of the earlier example of the GIS image of FIG. 38 that can be used for planting trees to block the direct view between building 620 and building 630, the user would have provided the present invention with a descriptive command to identify the cells in the collective matrix that include "O" and are also located between building 620 and building 630. FIG. 51 illustrates the resultant image the computer would produce on the computer display marking the site spots 910 that meet the user's requirement.

Figure 52:
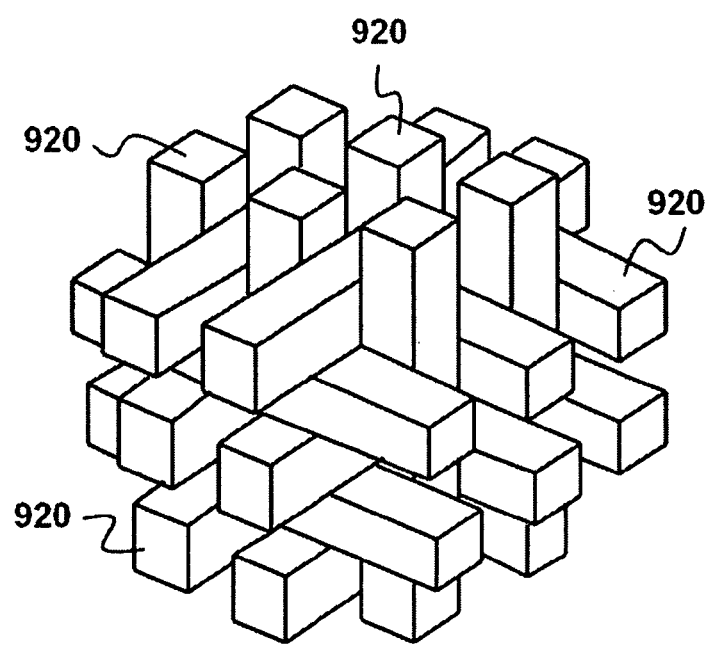

FIG. 52 illustrates an example of 3D informative graphical data of a 3D model comprised of a plurality of combined prisms 920 presented on the computer display. If the user needs to find the parts of the prisms that are completely surrounded by others prisms the user will request the present invention to list the intersection points that are only adjacent in 3D to other intersection points that carry an ID of a prism. If the user needs to find the part of the 3D model that is the furthest from the exterior surface than other parts, the user will request the present invention to find the intersection point/s of the previous list of intersection points that are completely surrounded by other prisms and, at same time, are furthest from the closest intersection point that carries an ID other than a prism ID.

Extracting Numerical Information

The previous examples illustrate extracting positional information related to the objects of the informative graphical data; however, it is also possible to extract numerical information related to said objects. For example, FIG. 53 illustrates a first object 930, a second object 940, and a third object 950 in a form of three polygons intersecting with each other on the computer display where the user needs to compute the area of intersection between the first object and second object. In this case, the user will describe the steps of finding the set of intersection points in the collective matrix that carry two IDs representing the first object and the second object then define the boundary intersection points of this set that are located on the boundary of this area. Knowing the x and y coordinates of the boundary intersection points enables computing the intersection area between the first and second objects by calculating the area of the imaginary polygon that successively connects between the boundary intersection points. Generally, a boundary intersection point in a set of intersection points is the intersection point that is directly adjacent to one or more intersection points that happens to have a different ID. FIG. 54 illustrates the spot 960 that represents the intersection area between the first object and the second object.

If the user needs to measure the boundary of the spot 960 that is adjacent to the third object 950, the user will describe the steps of finding the boundary intersection points of the spot 960 in the collective matrix that are directly adjacent to one or more intersection points that happen to have an ID representing the third object 950. In this case, the present invention will define the intersection points that are located on the dotted lines 970 of FIG. 55 as intersection points that meet the user's requirement. Connecting successively between these intersection points by a plurality of imaginary lines then computing the total length of these imaginary lines gives the length of the boundary of the spot 960 that is adjacent to the third object 950.

FIG. 56 illustrates a top view of a 3D model representing contour lines of a mountain. In this example, if the user needs to compute the volume of this mountain, the user will describe the steps of defining the groups of intersection points that are located on the exterior surface of the mountain in each xy-plane, then calculating the area of each imaginary polygon that connects between each group of said intersection points in each xy-plane, where multiplying the height between two successive xy-planes by the total areas of said imaginary polygons gives the volume of the mountain. If the user needs to measure the exterior area of the mountain that has a direct view to the south, where the south is assumed to be in the bottom direction of the figure, the user will provide steps in the same fashion as the earlier examples. The user will first find the intersection points that have a direct view to the south, as described previously, and then connect between each group of said intersection points in each xy-plane by a plurality of imaginary lines. Multiplying the height between two successive xy-planes by the total length of said imaginary lines gives the exterior area of the mountain that has a direct view to the south.

FIG. 57 illustrates another example for a 3D model of a cylinder 990 intersecting with a sphere 1000 on the computer display, where using the suitable descriptive commands enables the present invention to extract numerical information related to this 3D model. For example, the present invention can compute the volume of intersection between the sphere and the cylinder, the side area of this intersection, and the exterior area of the 3D model according to the intersection.

Path Mapping

Figure 58:
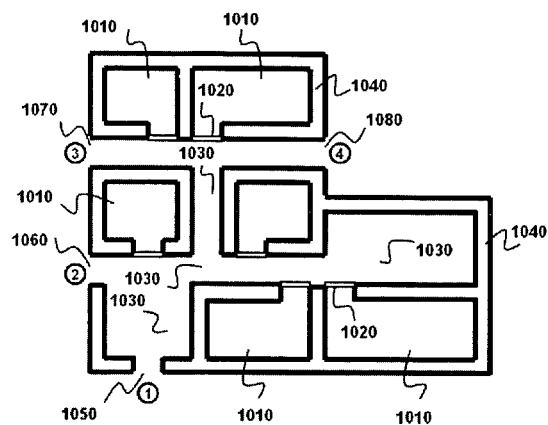
FIGS. 58 to 64 are finding a shortcut between two positions on a graphical datum.
Figure 59:
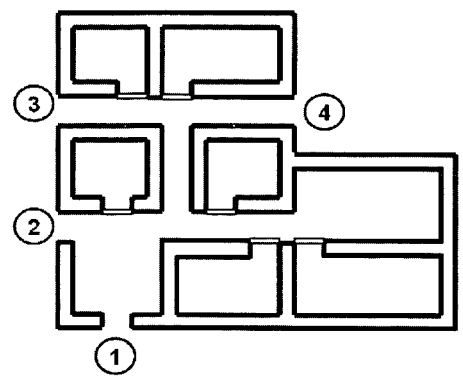

The previous examples described using descriptive commands to extract positional or numerical information from the informative graphical data, however, there are some types of commands that enable the present invention to extract useful information related to an imaginary movement on the graphical data. For example, FIG. 58 illustrates a building plan comprised of a number of rooms 1010, interior doors 1020, corridors or hallways 1030, walls 1040, a first exit 1050, a second exit 1060, a third exit 1070, and a fourth exit 1080. FIG. 59 illustrates a copy of the building plan without the numerals of the rooms, interior doors, corridors, walls, and exits; it only shows four numerals, 1, 2, 3, and 4 in four circles that, respectively, represent the first exit, the second exit, the third exit, and the fourth exit.

Figure 60:
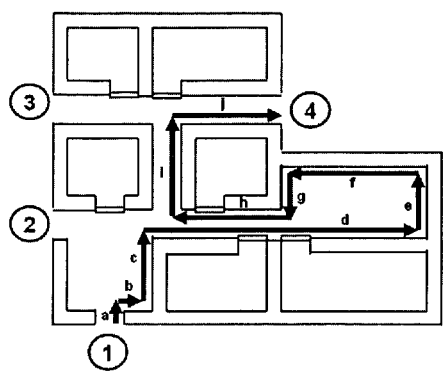
Figure 61:
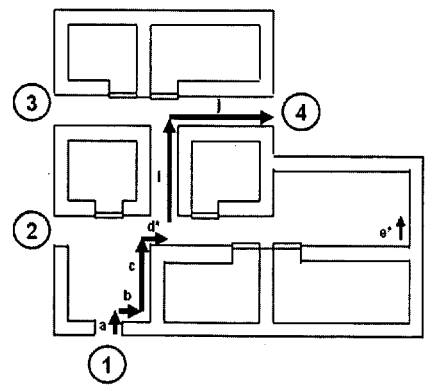

In this example the user needs to find the shortest path to move from exit 1 to exit 4 inside the building. To achieve this task the user is required to visualize the steps of this request. For example, FIG. 60 illustrates a first path starting from the right side of exit 1 and ending at exit 4. As shown in the figure, the first path moves on the borders between the hallway and the other building objects. The arrows a, b, c, d, e, f, g, h, i, and j represent the parts of this first path. It is important to note that this first path is not optimized since some of its parts have an opposite direction relative to each other. For example, arrow "d" has an opposite direction relative to arrows "h" and "f", and arrow "e" has an opposite direction to arrow "g". To remedy this, each two opposite parts of the path are to be deleted; accordingly FIG. 61 illustrates partially deleting arrow "d" and "e", and completely deleting parts "f", "g", and "h".

Figure 62:
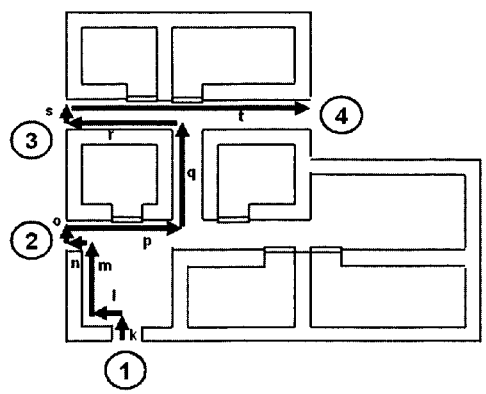
Figure 63:
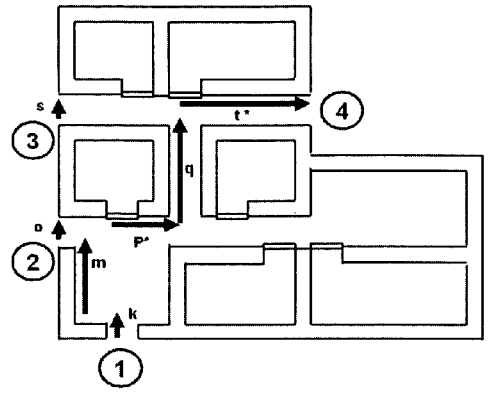
Figure 64:
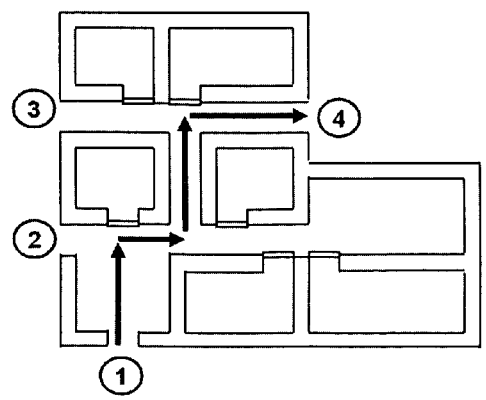

FIG. 62 illustrates moving from exit 1 to exit 4 starting from the left side of exit 1 where a second path appears as a result of this movement comprising of the parts k, l, m, n, o, p, q, r, s, and t. FIG. 63 illustrates deleting the parts of the second path that have an opposite direction relative to each other. Combing the parts of the first path and the second path of FIGS. 61 and 63 by making each part start at the end of its previous part leads to generating the final path of FIG. 64 which represents the shortest path from exit 1 to exit 4. In some cases, starting from the right side or the left side of a point or an exit may not lead to the same final path, where one path may be shorter than the other.

The previous description presents the concept of finding the shortest path from a start point to an end point. However, to describe these visual steps in a descriptive command, the user will request the present invention to find the set of intersection points that carry an ID of the hallway with an ID of another object of the building plane starting from the right side of exit 1 and ending with exit 4, then deleting each two intersection points of said set that have the same x or y coordinates, then positioning the lift intersection points in the set successively adjacent to each other. The final set of intersection points represents the first path, where repeating the same steps starting from the left side of exit 1 generates the second path. Comparing the length of the first path and the second path with each other then selecting the shortest one of them defines the shortest path between exit 1 and exit 4.

Error Detecting

Figure 65:
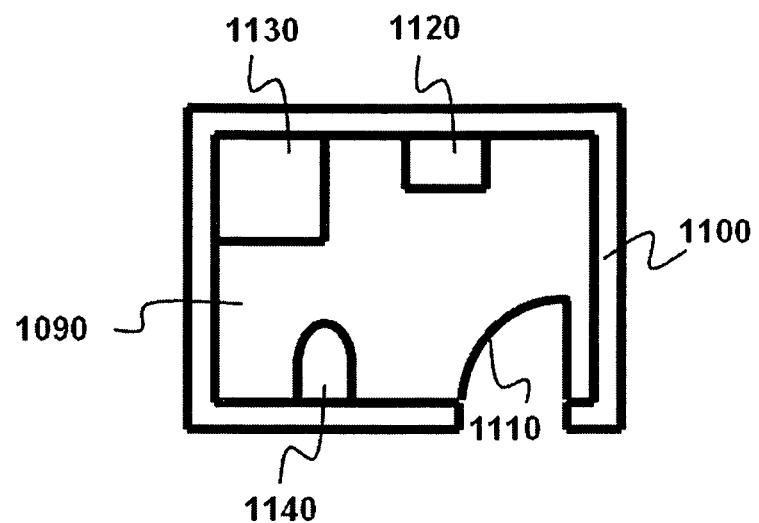
FIG. 65 is informative graphical data representing a bathroom design.

It is also possible to utilize the concept of the imaginary movement on the informative graphical data to detect a potential error in a drawing, 3D model, or the like. For example, FIG. 65 illustrates a drawing representing a bathroom plan 1090 comprised of four walls 1100, a door 1110, a sink 1120, a shower space 1130, and a toilet stall 1140. The design of this bathroom depends on the right positioning of the door, the sink, the shower space and the toilet stall relative to each other inside the bathroom to comply with the building code. For example, the building code requires the bathroom design to allow a handicapped person with a wheelchair to be able to turn the wheelchair while s/he using the bathroom. In other words, the design of the bathroom should allow an imaginary 60" diameter circle to fit inside the bathroom without intersecting with any of the bathroom's objects.

To check if the bathroom design complies or not with the building code, the present invention positions the building plan including the four walls, the door, the sink, the shower space, and the toilet stall on a first xy-plane, and position the imaginary circle on a second xy-plane. The first and second xy-planes are comprised of the same number of the intersection points of the bathroom plan. The present invention moves the imaginary circle on its xy-plane to be positioned in all possible locations of this plan. Each unique position of the imaginary circle on its xy-plane will be reflected on the collective matrix that represents the entire bathroom objects and the imaginary circle. Rejecting the positions of the imaginary circle that leads to having a cell in the collective matrix containing two IDs representing the imaginary circle and other bathroom's object enables detection of the compliance of the bathroom design with the building code.

Generally, if all the positions of the imaginary circle on its xy-plane are rejected based on the aforementioned rule, that means the wheelchair cannot be turned inside the bathroom; accordingly, the bathroom design does not comply with the building code. If there is one single position of the imaginary circle on its xy-plane that is not rejected based on the aforementioned rule, that means the wheelchair has a free turning radius inside the bathroom, or in other words, the bathroom design complies with the building code.

Simple Fitting

Figure 66:
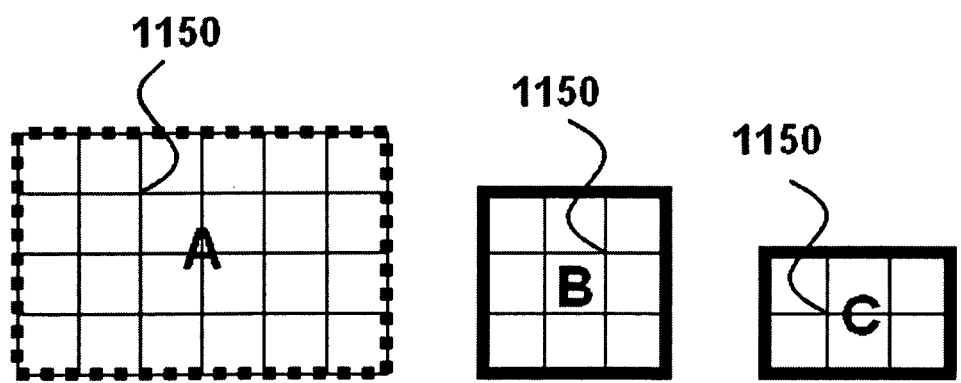
FIG. 66 is three spaces to be fitted together according to specific requirements.

The previous examples illustrate the capability of the present invention to extract positional, numerical, or directional information about the objects of the 2D/3D informative graphical data whereas said objects have fixed positions in the informative graphical data. In some other cases, the present invention can help in positioning a plurality of objects relative to each other to fit in a particular space or set of dimensions according to specific requirements or constraints generating design solutions for a design problem. This function serves many design applications in various fields such as IT, architecture, mechanics, electronics, or the like. For example, FIG. 66 illustrates three objects A, B, and C, where object B and object C are needed to be positioned adjacent to each other to fit inside object A. The three objects A, B, and C are in a form of 2D informative graphical data where each one of them is divided into a plurality of intersection points 1150 that carry an ID representing the object.

Figure 67:
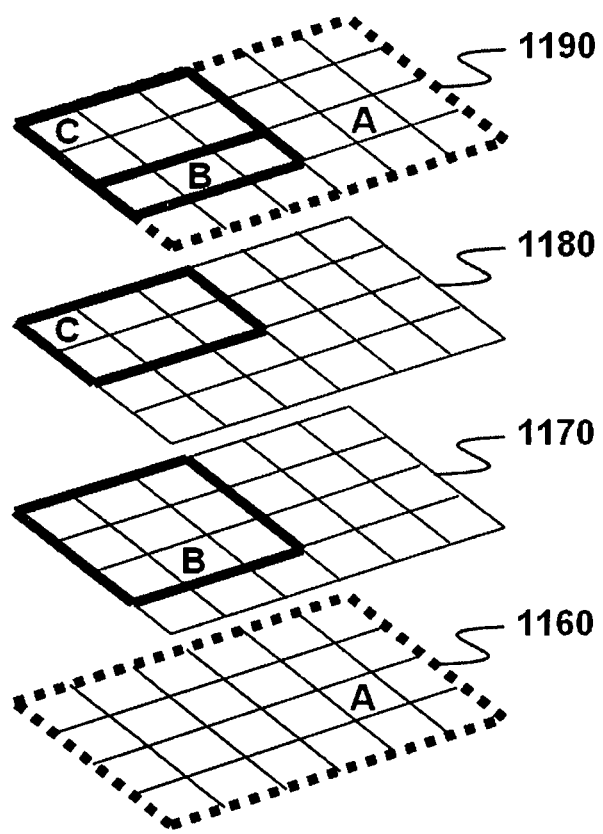
FIG. 67 is four matrices representing fitting the three spaces together.

To achieve this task, the present invention positions each one of objects A, B, and C in a separate xy-plane as illustrated in FIG. 67 where the xy-planes are comprised of the same number of the intersection points of object A so as to fit within it. As shown in the figure, object A is located on a first xy-plane 1160, object B is located on a second xy-plane 1170, and object C is located on a third xy-plane 1180. The fourth xy-plane 1190 represents the plane that indicates the final design according to the positioning of the three objects relative to each other. Three individual matrices are formed to represent each one of the three objects in its plane, and a collective matrix is formed to represent the three objects positioned together relative to each other. However, to position object B and C adjacent to each other so as to fit inside object A, the present invention moves object A and object B in their planes and reflects this movement in the collective matrix until reaching the positioning of the objects that meets the user's requirements.

Moving object B in its plane generates 8 positioning alternatives, while moving object C in its plane generates 12 positioning alternatives. Combining these alternatives with each other generates 96 design alternatives. The present invention will reject all design alternatives that do not make allowance for object B and object C to be adjacent to one another, or overlap each other. In other words, some cells of the collective matrix should include the two IDs that represent objects B and C and, at the same time, there are no four of these cells share the same unit of division or square. According to this descriptive command the present invention filters the 96 design alternatives into twelve acceptable designs whereas these twelve designs meet the user's requirements as illustrated in FIGS. 68.1 to 68.12.

It is possible to shorten the design alternative search by classifying each boundary line of object B and object C into top, bottom, left, and right sides. The process would then position object C where one of its sides is adjacent to a specific side of object B. For example, object C's bottom side starts at object B's top side, object C's left side starts at object B's right side, object C's top side starts at object B's bottom side, and object C's right side starts at object B's left side. This method of classifying the object's boundary lines dramatically shortens the span of time needed to generate the design alternatives, especially in cases that deal with a vast number of objects. Generally, the previously described technique can simply be used with the 3D design applications, where in such situations the objects are moved in three dimensions to fit inside a specific 3D space instead of only moving them in two dimensions to fit inside a 2D space as in cases of 2D design applications.

Complex Fitting

Figure 69:
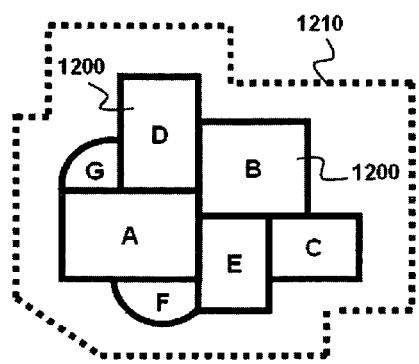
FIG. 69 is a building design generated by the present invention.

Grouping a plurality of objects relative to each other requires more than just fitting them inside a two, or three-dimensional space, where in most cases there are complex requirements, constraints, or restrictions that govern such fitting. For example, FIG. 69 illustrates a design alternative for a building design comprised of seven spaces 1200 symbolized with Latin letters A, B, C, D, E, F, and G where these seven spaces are adjacent to each other to fit in a building site 1210 according to specific design requirements and constraints. For example, according to the design requirements or constraints of this building design, spaces B and D must have a direct view to the north, while space C and E must have a direct view to the east. Space A must be in a direct contact with spaces B, E, D, and G, while space E must be separated form spaces D and G. The wall that is located between space A and B must be less than 6 feet, and between space A and D must be greater than 12 feet. The exterior walls of the building must be a minimum of 8 feet away from the site boundary.

All such design requirements are provided as descriptive commands to the present invention to enable generating the acceptable alternatives of the building design that meet the aforementioned requirements and constrains. For example, to make space B and space D have a direct view to the north, some cells from the upward columns of the collective matrix must have IDs representing space B and space D. To make space A in direct contact with space B, some cells of the collective matrix must include two IDs representing space A and space B. To ensure separating space E from space D in the building design, the present invention will reject the design alternatives that make a cell in the collective matrix contain two IDs representing spaces E and D. To ensure that the wall that is located between space A and space B is less than 6 feet, the present invention will reject all design alternatives that make the length of the imaginary lines that successively connect between the points of intersection that carry two IDs representing space A and space B to be equal to or greater than 6 feet. To ensure that the exterior walls of the building design are positioned a minimum of 8 feet from the site boundary the present invention will temporarily delete the cells of the individual matrices that represent the parts of the building site that are within 8 feet from the boundary.

Figure 70:
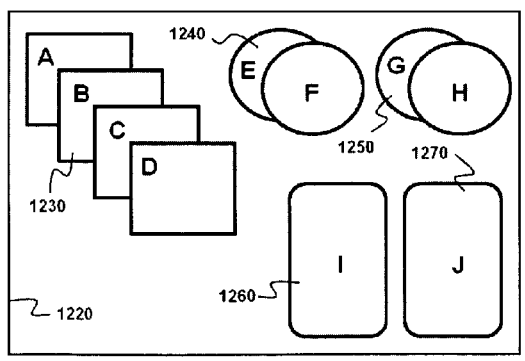
FIGS. 70 and 71 are repositioning a plurality of objects in a Microsoft PowerPoint application.

Generally, such requirements or constraints of the aforementioned building design are very common in architectural design, which means they will be programmed once only as descriptive commands to be used later as reference commands. FIG. 70 illustrates another example for a Microsoft PowerPoint application 1220 presenting 10 shapes classified into five groups, the first group 1230 includes four squares A, B, C, and D, the second group 1240 includes two circles E and F, the third group 1250 includes two circles G and H, the fourth group 1260 includes a rounded rectangle I, and the fifth group 1270 includes another rounded rectangle J. The user needs to reposition the ten shapes in the slide so as to be individually separated from each other and, at the same time, the shapes of the same group to be located within close proximity to one another.

Figure 71:
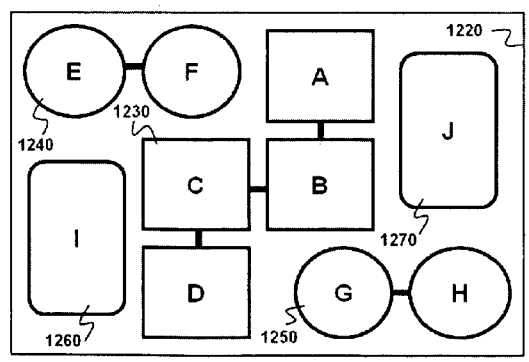

FIG. 71 illustrates a design alternative generated by the present invention locating the five groups of shapes in the slide according to the user's requirements. To reach such a design alternative, the present invention ensures that each cell of the collective matrix has only one ID representing one of the 10 shapes to guarantee that there are no two shapes that overlap or are adjacent to each other. To relocate the shapes of the same group so as to be close to each other, the present invention ensures that at least one of the boundary intersection points of each shape of the 10 shapes is located within a specific maximum distance from a boundary intersection point of a shape from the same group. The numerical value of said specific maximum distance is provided by the user to the present invention to clarify or interpret the meaning of the aforementioned phrase, "close proximity," in the design requirements.

Identifying 2D Geometrical Objects

The present invention enables identifying the objects that may appear in pictures, videos, or the like where such automated identification can be utilized to serve various purposes and applications. Generally, such objects can be categorized into five main types, the first type is the 2D geometrical objects, the second type is the 3D geometrical objects, the third type is the combined geometrical objects, the fourth type is the simple organic objects, and the fifth type is the combined organic objects. FIG. 72 illustrates an example for 2D geometrical objects in the form of a picture 1280 including a triangle 1290, a square 1300, and a rectangle 1310.

To identify such 2D geometrical objects, the present invention performs three technical steps. The first technical step is to create a number of boundary lines representing the boundary lines of each object. This is achieved by identifying the boundary intersection points of each object then creating a line connecting each two successive intersecting boundary points. Combining the successive lines that have the same slope, generates the boundary lines of each object. The second technical step is to calculate the lengths of the boundary lines and the angle between each two successive lines of them. For example, according to the first technical step, the boundary lines of the second object 1300 are found to be four lines, where the x and y coordinates of the start point and the end point of each line of the four lines are known. Accordingly, the present invention calculates the lengths of the four lines and the angle between each two successive lines of them. Thusly, the second object will be defined as an object with four equal boundary lines where the angle between each two successive lines of them is 90 degrees.

The third technical step is to compare the number of the boundary lines of the object, the length ratios between them, and the angle between each two connected boundary lines with a database that associates the objects' names with the attribute of their boundary lines. For example, said database describes that the square is a 2D geometrical object that has four boundary lines, where the length ratios between them are 1:1:1:1, and the angle between each two connected lines is 90 degrees. Accordingly the present invention will define the second object as a square, and in a similar manner will define the first object as a triangle and the third object as a rectangle.
Identifying 3D Geometrical Objects.

Each 3D geometrical object appears in pictures, videos, or the like as an object comprised of a plurality of 2D geometrical objects that are attached to each other in a specific manner or form. For example, FIGS. 73.1 to 73.4 illustrate a cube as it appears from four different points of view. In FIG. 73.1 the cube appears as a square 1320 and two parallelograms 1330 and 1340 attached to each other. In FIG. 73.2 the cube appears as three parallelograms 1350, 1360, and 1370 attached to each other. In FIG. 73.3 the cube appears as a square 1380 and a trapezoid 1390 attached to each other. In FIG. 73.4 the cube appears as a square 1400 when looking at the cube from the top view or the side view. Accordingly, the database can describe each 3D geometrical object as a plurality of 2D geometrical objects that are attached to each other in a specific form. For example, the database can define the cube as a square and two parallelograms attached to each other, three parallelograms attached to each other, a square and a trapezoid attached to each other, or a single square.

It is possible to automate the database generation by creating a 3D model for the 3D geometrical object, then rotating this 3D model horizontally and vertically in front of the virtual camera to record the different shapes of the 3D model that are comprised of different 2D geometrical shapes attached to each other. This manner of automating the creation of the database is much easier and faster than any manual input to the present invention that will depend on the higher probability of erring that is innate to the human experience.

Identifying Combined Geometrical objects

Figure 74:
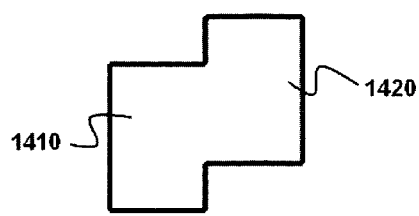
FIGS. 74 and 75 are two examples of combined objects that can be identified by the present invention.
Figure 75:
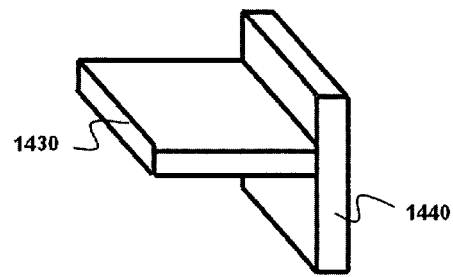
Figure 76:
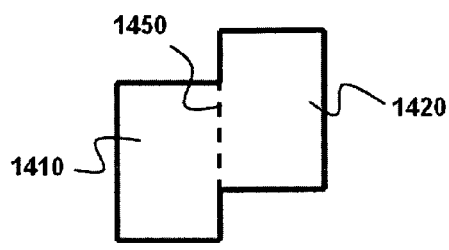
FIGS. 76 and 77 are converting the combined objects into a plurality of simple objects.
Figure 77:
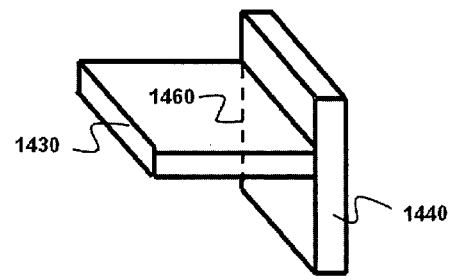

Many objects are comprised of a plurality of 2D and/or 3D geometrical objects that are combined with each other in a specific manner. For example, FIG. 74 illustrates a 2D combined geometrical object that can be described as a first rectangle 1410 and a second rectangle 1420 that are partially attached to each other from one side. FIG. 75 illustrates an example for a 3D combined geometrical object that is comprised of a first cuboid 1430 and a second cuboid 1440 attached to each other, where one of the two cuboids partially hides the other. Generally, to identify such combined geometrical objects, the present invention completes the hidden parts or the missing lines of the geometrical objects due to the attachment. For example, FIG. 76 illustrates adding an imaginary line 1450 to FIG. 74 to complete the missing line of the first and second rectangles. Also, FIG. 77 illustrates adding an imaginary line 1460 to FIG. 75 to complete the missing line of one of the parallelograms of the second cuboid. Adding an imaginary line to present a hidden line of an object is done by drawing a line connecting between two parallel boundary lines of the object that can be located on one ray. This can be done using the matrices model where at this level the present invention can automatically identify the object's name as described previously.

Identifying Organic Objects

The boundary lines of the organic objects are mainly comprised of a plurality of curves, however, the organic objects can be classified into simple organic objects and combined organic objects. FIG. 78 illustrates a banana which is an example of a simple organic object that its boundary lines comprised of a plurality of curves. To identify such organic object in pictures, images, or the like, the present invention categorizes the boundary lines of the banana into groups of lines. For example, as illustrated in FIG. 79, the boundary lines of the banana are classified into four groups of lines 1470 to 1500 separated by four small circles 1510. The first 1470, second 1480, third 1490, and fourth group of lines 1500 are, respectively, comprised of seven lines, four lines, twelve lines, and five lines. The angle between each two lines that share one end in the first, second, third, and fourth group of lines, respectively, ranges from 150 to 180 degrees, 201 to 270 degrees, 181 to 200 degrees, and 201 to 270 degrees. The total length of the first, second, third, and fourth group of lines, respectively, ranges from 10x to 14x, 3x to 5x, 14x to 18x, and 3x to 5x, where x represents a unit of length.

FIG. 80 is a table illustrating the database that defines the shape of the banana based on the description of its boundary lines. It is important to note that the angles between the boundary lines of the banana are measured from its exterior side. However, based on this database, the present invention can automatically identify the banana when it appears in pictures, images, or the like by dividing its boundary lines into groups of lines then comparing the properties of these groups of lines with said database.

Generally, the majority of the organic objects are combined organic objects that are comprised of a plurality of simple organic objects that are attached to each other in a specific form. For example, the human hand is an example of a combined organic object that is comprised of five fingers and a palm where each one of the five fingers and the palm is considered a simple organic object. Accordingly, to identify the human hand, the database will describe the five fingers and the palm as simple organic objects, in addition to describing the manner of attachment between the five fingers and the palm. It is important to mention that most combined organic objects such as the human, animal body or the like, contain joints that help them to position their bodies in different shapes. These different shapes must be taken into consideration when defining such combined organic objects in a database.

Modifying Commands

The present invention helps the user to determine his/her requirements even if s/he does not have a clear idea about these requirements. For example, in the case of a design application, if the user does not have in his/her mind all the design requirements, s/he will start providing the present invention with the requirements that s/he already knows. Once the present invention generates a primary design alternative that the user sees it as a defective solution, the user will provide a requirement that corrects this defective solution, where this correction will be a basic requirement that was not clear to the user in the beginning. This process always happens in the design tasks where the user starts the design process without having a clear idea about all the design requirements until s/he sees some defective design alternatives. Graphic design, architectural design, mechanical design, and electronic design are examples of areas of design where the user usually does not have well-defined design requirements from the beginning. In other words, some of the user's descriptive commands may not be complete enough until the present invention helps the user to correct his/her commands by graphically presenting a defective design alternative on the computer display.

New File Format

Generally, the two main types of graphics formats are raster graphics and vector graphics where both two types of graphics formats cannot provide the user with any information other than presenting raw graphical data. The present invention enables obtaining the new type of graphics format that has been referred to as "informative graphics," where the user can interact with this informative graphics format to extract useful information from images, pictures, drawings, videos, or 3D models according to his/her needs or requirements.

The informative graphics can be integrated with desktop and web-based applications similar to the integration of raster and vector graphics. For example, a picture or image can be inserted in a Microsoft Word page where the user can interact with this picture or image extracting any needed information according to his/her needs or requirements. This can be achieved by double clicking the mouse's left button while the cursor is located over the picture or image where a text box appears on the computer display to enable the user to write his/her descriptive or reference commands. Also, a Web site may include a drawing or picture where the Web site visitor can interact with this drawing or picture extracting specific information that is not available on the Web site. This application is vital especially in cases of dealing with professionals such as engineers, physicians, or researchers when they visit related Web sites.

Also, presenting a video such as one with 3D animation on the computer display using the informative graphics, would enable the user to extract specific information at a specific time or position of the contents of the video by simply providing the user's question in a form of descriptive or reference command. All such unique uses and applications enrich the interaction between the user and the computer giving useful information and unique tools or processes to achieve various tasks in an automated manner saving time and effort while reaching optimal results that would otherwise be difficult to achieve.

Process and Potential Applications

Figure 81:
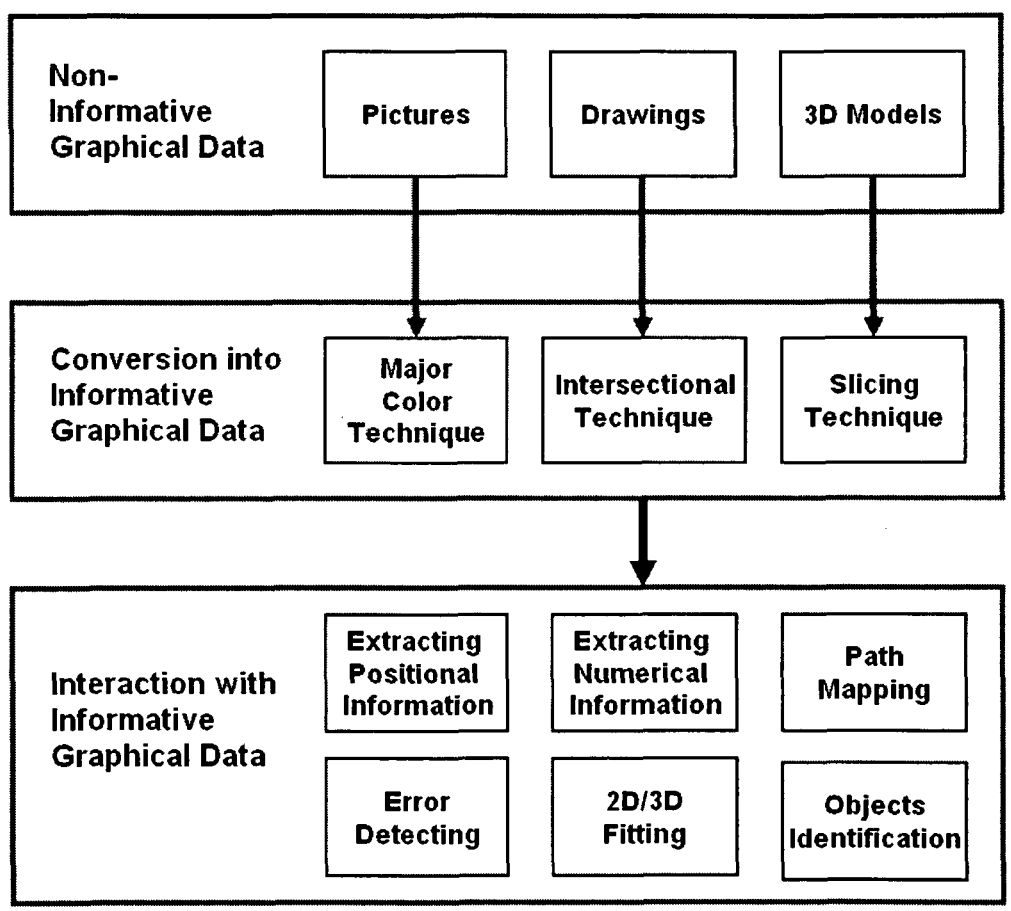
FIG. 81 is a flowchart presenting the process and potential applications of the present invention.

FIG. 81 illustrates a flowchart presenting the processes of converting the non-informative graphical data into informative graphical data using different techniques according to the nature of the non-informative graphical data presented. For example, the major color technique is utilized to convert the digital pictures or the raster images form non-informative graphical data into informative graphical data. The intersectional technique is used to convert the vector drawings from non-informative graphical data into informative graphical data. The slicing technique is utilized to convert 3D models from non-informative graphical data into informative graphical data.

As shown in the figure, after converting the non-informative graphical data into informative graphical data, the present invention can extract positional information or extract numerical information related to the objects of the pictures, drawings, or 3D models. The present invention can find a path or a shortcut between two points on the informative graphical data, or detect an error related to the objects of the informative graphical data. The present invention can also fit a plurality of 2D/3D objects relative to each other in a 2D/3D space according to specific requirements or constraints generating design solutions for a design problem. The present invention can identify the objects' names in pictures, videos, or the like serving various IT, medical, engineering, and industrial applications.

Overall, the previously described concept of the virtual cube and matrices algorithm enables the user to interact with the matrices models of the pictures, drawings, or 3D models in a simple manner where s/he can select, delete, move, copy, rotate, or classify a group of intersection points on the computer display to serve his/her special or sophisticated descriptive commands or requirements.

The invention claimed is:

1. A method that converts a drawing into a number of matrices that enable a user to interact with said drawing for a specific purpose wherein the drawing comprises a plurality of shapes defined by a plurality of boundary lines according to a vector graphics format, and wherein said method comprises the steps of:
a) assigning each boundary line of said drawing one or more identifiers ("IDs") representing one or more objects of said drawing that said boundary line is located in;
b) dividing said drawing by a plurality of horizontal lines and vertical lines that are positioned equally apart from each other wherein each intersection between said horizontal lines and said vertical lines represents an intersection point, and each intersection between said horizontal lines or said vertical lines and a boundary line of said drawing represents a node of intersection that is assigned a same ID of said boundary line of said drawing;
c) for each one of said nodes of intersection, determining a closest one of said intersection points and assigning the ID of said node of intersection to said closest one of said intersection points;
d) forming a number of individual matrices wherein each individual matrix represents one type of said boundary lines of said drawing that are assigned the same ID, wherein each cell of said individual matrix represents one of said intersection points and contains one ID corresponding to said intersection points;
e) forming a collective matrix representing all types of said boundary lines of said drawing that carry different IDs, wherein each cell of said collective matrix represents one of said intersection points and contains one or more IDs corresponding to said intersection points; and
f) accessing the cells of said individual matrices or the cells of said collective matrix to extract specific information about said boundary lines or said objects of said drawing to serve said specific purpose.

2. The method of claim 1 wherein said specific purpose is identifying a name of an object and wherein accessing the cells of said individual matrices or the cells of said collective matrix to extract specific information about said lines or said objects of said drawing comprises comparing attributes of boundary lines of each one of said objects with a database that associates a name of an object with an attribute of the object's boundary lines.

3. The method of claim 1 wherein said specific purpose is extracting positional information related to said lines or said objects relative to each other or relative to a boundary line of said drawing and wherein accessing the cells of said individual matrices or the cells of said collective matrix to extract specific information about said lines or said objects of said drawing comprises comparing the positions of the cells of said individual matrices or said collective matrix relative to each other or relative to a boundary of said individual matrices or said collective matrix.

4. The method of claim 1 wherein said specific purpose is extracting numerical information, either length or area, related to said lines or said objects and wherein accessing the cells of said individual matrices or the cells of said collective matrix to extract specific information about said lines or said objects of said drawing comprises computing the number of specific cells of said individual matrices or said collective matrix that represent said numerical information.

5. The method of claim 1 wherein said specific purpose is finding a path between a first point and a second point in said drawing and wherein accessing the cells of said individual matrices or the cells of said collective matrix to extract specific information about said lines or said objects of said drawing comprises determining a group of cells in said individual matrices or said collective matrix that are attached to each other and connect between the position of said first point and the position of said second point.

6. The method of claim 1 wherein said specific purpose is detecting an error in said drawing and wherein accessing the cells of said individual matrices or the cells of said collective matrix to extract specific information about said lines or said objects of said drawing comprises comparing the positions of the cells of said individual matrices or said collective matrix relative to particular criteria related to said error.

7. The method of claim 1 further comprising:
receiving an indication that the user clicked on an icon that represents a specific identifier ("ID") on the computer display;
receiving an indication that the user drew a polygon on top of a group of said lines; and
assigning said group of said lines the same ID of said icon.

8. The method of claim 1 wherein said intersection points are positioned in a virtual cube that is divided into xy-planes, xz-planes, and yz-planes positioned equally apart from each other where each intersection of an xy-plane, an xz-plane, and a yz-plane represents a potential position for one of said intersection points where the user can select, delete, move, copy, rotate, or classify a group of said intersection points on the computer display to serve said specific purpose.

9. The method of claim 1 wherein none of the shapes contains a colored pixel, and wherein no colored pixels are present between the boundary lines.

* * * * *